United States Patent
de Haas

(10) Patent No.: US 11,584,314 B2
(45) Date of Patent: Feb. 21, 2023

(54) COLLISION DETECTION ON A CAN BUS

(71) Applicant: NXP B.V., Eindhoven (NL)

(72) Inventor: Clemens Gerhardus Johannes de Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 277 days.

(21) Appl. No.: 16/916,369

(22) Filed: Jun. 30, 2020

(65) Prior Publication Data

US 2021/0001788 A1    Jan. 7, 2021

(30) Foreign Application Priority Data

Jul. 2, 2019  (EP) .................................... 19183983
Mar. 4, 2020  (EP) .................................... 20161041

(51) Int. Cl.
*B60R 16/023* (2006.01)
*H04L 12/40* (2006.01)

(52) U.S. Cl.
CPC ............ *B60R 16/023* (2013.01); *H04L 12/40* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 4,706,082 A | 11/1987 | Miesterfeld et al. | |
| 5,197,066 A | 3/1993 | Sutterlin | |
| 2010/0131816 A1 | 5/2010 | Yamamoto et al. | |
| 2010/0306422 A1* | 12/2010 | Kodama | H04L 12/413 710/30 |
| 2014/0156893 A1 | 6/2014 | Monroe et al. | |
| 2017/0264458 A1* | 9/2017 | Nickel | H04L 12/4015 |
| 2018/0136311 A1* | 5/2018 | Paradie | G01S 13/931 |
| 2021/0036884 A1* | 2/2021 | Walker | H04L 12/4013 |

FOREIGN PATENT DOCUMENTS

| | | |
|---|---|---|
| EP | 0 237 839 A2 | 9/1987 |
| EP | 2 661 032 A2 | 6/2013 |
| EP | 3 217 602 A1 | 9/2017 |

* cited by examiner

*Primary Examiner* — Diane L Lo

(57) ABSTRACT

The disclosure relates to a controller area network, CAN, unit and associated method and computer program. The CAN unit is configured to detect a transmit signal edge on a transmit signal for a CAN transceiver; detect a corresponding receive signal edge on a receive signal for a CAN controller of the CAN transceiver; and detect a collision on the CAN bus based on a propagation delay between the transmit signal edge and the corresponding receive signal edge.

14 Claims, 13 Drawing Sheets

COLLISION DETECTION ON A CAN BUS

CROSS-REFERENCE TO RELATED APPLICATIONS

This application claims the priority under 35 U.S.C. § 119 of European patent application no. 20161041.7, filed on Mar. 4, 2020, and European patent application no. 19183983.6, filed on Jul. 2, 2019 the contents of which are incorporated by reference herein.

TECHNICAL FIELD

The present disclosure relates to at least one of a CAN device, a CAN transceiver, and a CAN controller, and to at least one of a method for operating a CAN device, a CAN transceiver, and a CAN controller. The present disclosure further relates to a CAN bus system comprising CAN devices, and a method for operating a CAN bus system comprising CAN devices.

BACKGROUND

In-vehicle network (IVN) busses, such as CAN (Controller Area Network), CAN FD (CAN with Flexible Data-Rate), LIN (Local Interconnect Network), FlexRay, Ethernet based network busses, and other types, can be used for communications within vehicles. For example, controller area network (CAN) bus is a message-based communications bus protocol that is often used within automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-2:2016 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard. However, it is of interest to allow backwards compatibility between all the CAN flavours, for example, CAN XL with CAN FD.

SUMMARY

According to a first aspect of the present disclosure there is provided a controller area network, CAN, unit for communicating with a CAN bus, the unit configured to:
  detect a transmit signal edge on a transmit signal for a CAN transceiver;
  detect a corresponding receive signal edge on a receive signal for a CAN controller of the CAN transceiver; and
  detect a collision on the CAN bus based on a propagation delay between the transmit signal edge and the corresponding receive signal edge.

According to a second aspect of the present disclosure there is provided a controller area network, CAN, transceiver for communicating between a CAN controller and a CAN bus, the transceiver comprising:
  a transmitter configured to transmit an output signal to the CAN bus based on a transmit signal from the CAN controller; and
  a receiver configured to receive provide a receive signal to the CAN controller based on an input signal received from the CAN bus, the transceiver configured to:
  detect a collision on the CAN bus based on a propagation delay between a signal edge on the transmit signal and a corresponding signal edge on the receive signal.

According to a further aspect of the present disclosure there is provided a controller area network, CAN, controller for communicating with a CAN bus via a CAN transceiver, the controller configured to:
  generate a transmit signal for the CAN transceiver;
  receive a receive signal from the CAN transceiver; and
  detect a collision on the CAN bus based on a propagation delay between a signal edge on the transmit signal and a corresponding signal edge on the receive signal.

According to a further aspect of the present disclosure there is provided a controller area network, CAN, node for communicating with on a CAN bus, the node comprising a CAN transceiver and a CAN controller, in which the CAN controller is configured to communicate transmit and receive signals with the CAN transceiver using a CAN protocol, in which at least one of the CAN controller and the CAN transceiver is configured to detect a collision on the CAN bus based on a propagation delay between a signal edge on the transmit signal and a corresponding signal edge on the receive signal.

In one or more embodiments the CAN unit may be a CAN transceiver, a CAN controller or a CAN node. The CAN unit may be a CAN FD or CAN XL unit. Collision detection may occur during the data phase. A CAN bus collision may occur in a period when two CAN nodes are transmitting during a data phase.

In one or more embodiments the collision is detected based on a plurality of propagation delays between respective signal edges on the transmit signal and corresponding signal edges on the receive signal.

In one or more embodiments the transmit signal edge is a first transmit signal edge and the corresponding receive signal edge is a first receive signal edge, and the CAN unit is further configured to:
  detect a second transmit signal edge;
  detect a second receive signal edge that corresponds to the second transmit signal edge;
  determine a first propagation delay based on a period between the first transmit signal edge and the first receive signal edge;
  determine a second propagation delay based on a period between the second transmit signal edge and the second receive signal edge;
  detect a collision on the CAN bus based on a comparison between the first propagation delay and the second propagation delay.

In one or more embodiments the first receive signal edge and first transmit signal edge are both falling edges and the second receive signal edge and the second transmit signal edge are both rising edges.

In one or more embodiments the collision is detected is a difference between the first propagation delay and the second propagation delay is greater than a threshold.

In one or more embodiments the receive signal edge corresponding to the transmit signal edge occurs subsequently to the transmit signal edge, and
in which the receive signal edge and transmit signal edge are both falling edges.

In one or more embodiments the receive signal edge corresponding to the transmit signal edge occurs before the transmit signal edge, and
in which the receive signal edge and transmit signal edge are both rising edges.

In one or more embodiments the collision is detected when the propagation delay exceeds a threshold.

In one or more embodiments the threshold is a time period of at least the range symmetry specification value.

In one or more embodiments the CAN unit is further configured to detect the collision during a fast data phase of CAN operation.

In one or more embodiments the CAN unit is further configured to switch to a slow, arbitration mode of operation in response to detecting a collision on the CAN bus.

In one or more embodiments the CAN unit is further configured to:
initialize a respective corresponding delay variable to track the measurement of the one or both of the first propagation delay and the second propagation delay;
wait for a signal edge in one or more of the transmitter input or output signal and the receiver input or output signal;
increment, upon detection of the signal edge, the respective corresponding delay variable by a delay variable value;
iterate over the wait and increment configurations until the respective corresponding delay variable exceeds a predetermined value; and
detect the collision on the CAN bus when the value of the respective corresponding delay variable exceeds the predetermined value.

In one or more embodiments the CAN unit is further configured to:
convert the one or more of the first signal edge propagation delay and the second signal edge propagation delay into respective a first signal edge propagation delay voltage and a second signal edge propagation delay voltage;
detect the collision on the CAN bus when one or more of the first signal edge propagation delay voltage and second signal edge propagation delay voltage exceed respective fixed voltages.

According to a further aspect of the present disclosure there is provided a method for operating for detect a collision on a CAN bus, comprising:
detecting a transmit signal edge on a transmit signal for a CAN transceiver;
detecting a corresponding receive signal edge on a receive signal for a CAN controller of the CAN transceiver; and
detecting a collision on the CAN bus based on a propagation delay between the transmit signal edge and the corresponding receive signal edge.

According to a further aspect of the present disclosure, computer program code is provided. There may be provided a non-transient computer readable medium comprising the computer program code. Computer program code may be provided that is configured to cause a processor to execute any method disclosed herein. Computer program code may be configured to cause a processor of a CAN controller to provide instructions to a CAN transceiver to transmit a wake-up indication on the CAN bus, the wake-up indication comprising a signal having a predetermined pattern of one or more periods in which the signal is less than or equal to the third threshold level.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 1b shows an example schematic block diagram of a node on the CAN bus network of FIG. 1a;

DESCRIPTION

Figure 1A:
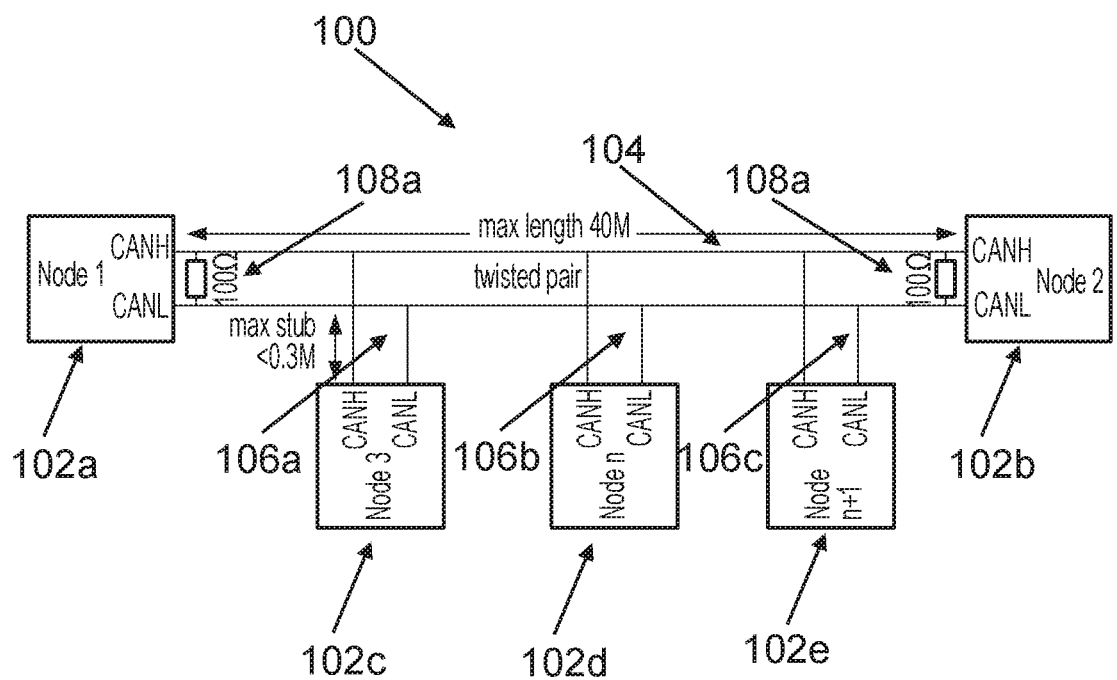
FIG. 1a shows an example schematic block diagram of a controller area network (CAN) bus network.

It will be readily understood that the components of the embodiments as generally described herein and illustrated in the figures could be arranged and designed in a wide variety of different configurations. Thus, the following description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Currently a new flavour of the CAN protocol, called "CAN XL", is in the definition phase. This new CAN flavour has defined two modes for the transceiver called "slow" and "fast". The "slow" mode is designed to be backwards compatible with the existing CAN FD transceivers while the "fast" mode has a new voltage level scheme for the transmitter and receiver to enable 10 Mbps communication. From a system point of view, it is key that all nodes in the network are synchronized to the same "fast" or "slow" mode to ensure reliable communication and error detection.

The present disclosure may relate to a CAN XL transceiver concept which can detect reliable collision on the bus while the transceiver is in the "fast" mode. A collision can be another node transmitting on the bus. The detection is reliable when a collision is detected even if, e.g. due to bad terminated network topology, reflections are present on the bus.

Currently the industry defines a new flavour of CAN called CAN XL. This new protocol variant targets higher baud-rates (>10 Mbps) compared to CAN/CAN FD. This speed increase can be realized with a different bus voltage level scheme for the data phase compared to the know CAN/CAN FD bus voltage level scheme. The CAN XL transceiver needs to operate in two different modes called "slow" (during arbitration phase) and "fast" (during data phase). It is essential that all nodes in the network are synchronized to the same operating mode for reliable communication and error detection. The CAN XL controller is able to switch the CAN XL transceiver between these two modes. The mechanism how this switching is implemented is not part of this disclosure. The CAN XL node, for example, the transceiver, should be able to detect a collision on the bus while operating in the fast mode. A collision occurs if one or multiple other nodes are also transmitting on the bus during the data phase. In the CAN standard it has been defined that the node which has won arbitration, is the only one allowed to transmit on the bus during the data phase. If a CAN controller (CAN/CAN FD/CAN XL) in a receiving node is detecting an error, it will transmit an error frame (long dominant) resulting in a collision on the bus. With the existing CAN bus voltage level scheme, a dominant level would always overrule the recessive levels, meaning a long dominant error frame would always be reliable detected. The new voltage level scheme of CAN XL in the fast mode is not dominant nor recessive but level0 or level1. Since the level0 and level1 are actively driven on the bus, a dominant (or active) level driven by another node will result in undefined bus voltage levels and the error frame is not reliable detected anymore for a node, which is actively sending in fast mode.

Collision detection needs to be reliable with network topologies which have long stubs resulting in reflections. This disclosure is based on the fact that during the fast mode the transmitter is driving the bus with symmetrical (in terms of timing) voltages and impedances for the logic 0 and logic 1 and that a collision would result in violating the timing symmetry specification.

FIG. 1a illustrates a Controller Area Network (CAN) bus network 100 comprising multiple nodes, or devices, 102a-e and a twisted pair cable providing a CAN bus 104 for communicating a differential signal between the multiple CAN nodes 102a-e via stubs (e.g., stubs 106a-c). There are termination resistors 108a,b at the end nodes (node 1 and 2) 102a, 102b, as an example is shown in FIG. 1a.

Figure 1B:
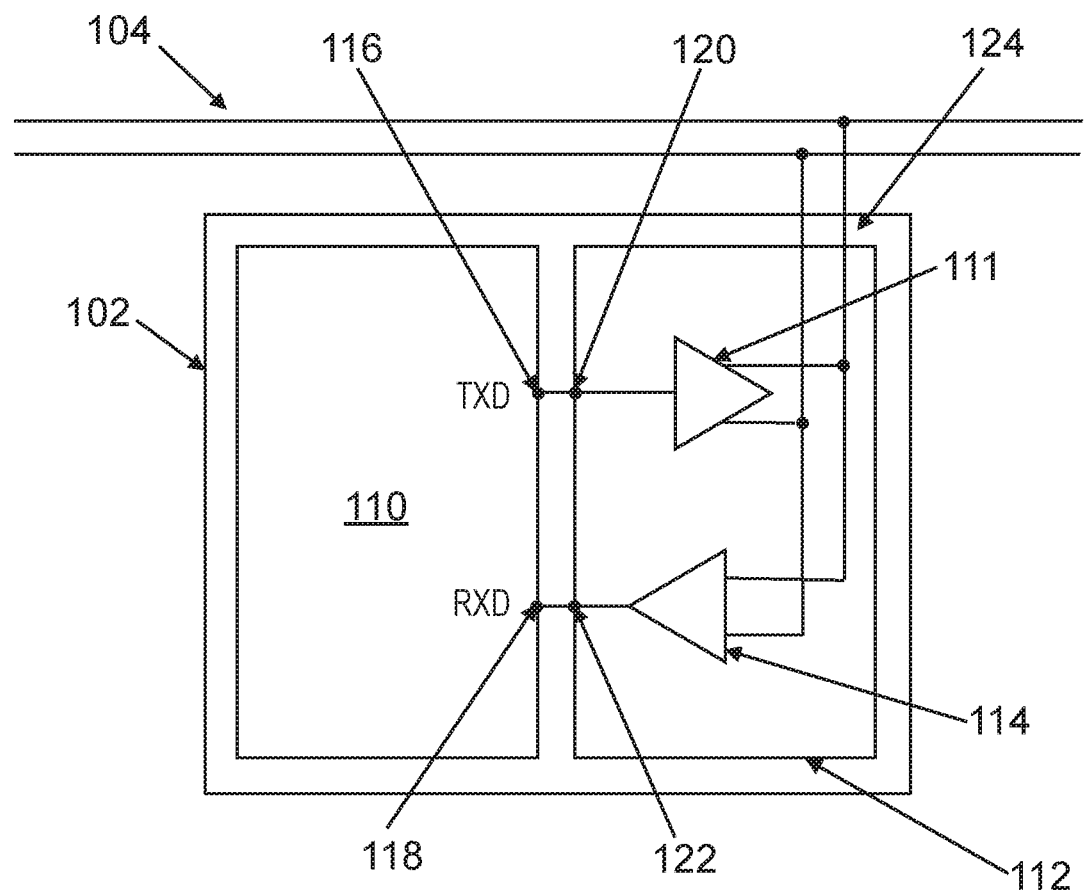

FIG. 1b illustrates a schematic block diagram of a CAN node, or device, 102 coupled to the CAN bus 104 of FIG. 1a. The CAN node 102 comprises a CAN controller 110 and a CAN transceiver 112. The CAN controller 110 may be implemented by a processor, such as a microprocessor, configured to implement a CAN protocol of operation within the CAN bus network 100. The CAN transceiver 112 interfaces the CAN controller 110 with the CAN bus 104. In some examples, the CAN transceiver 112 can operate with no, or limited, circuitry for understanding or implementing the CAN protocol and so may be of relatively limited power consumption compared to the processor of the CAN controller 110.

The CAN controller 110 has a transmit output 116 and a receive input 118. The CAN transceiver 112 has a transmit input 120, a receive output 122 and a bus terminal 124, which may also be referred to as a bus port. The bus terminal 124 is coupled to the two signal lines of the CAN bus 104. The transmitter output 116 of the CAN controller 110 is coupled to the transmit input 120 of the CAN transceiver 112. The receive input 118 of the CAN controller 110 is coupled to the receive output 122 of the CAN transceiver 112.

The CAN transceiver 112 comprises a transmitter unit 111 and a receiver unit 114. The transmitter unit 111 has an input coupled to the transmit input 120 of the CAN transceiver 110 and outputs connected to the CAN bus terminal 124 of the CAN transceiver 112. The transmitter unit 111 is configured to convert data received at the transmit input 120 of the CAN transceiver 112 to a differential signal for the CAN bus 104.

The receiver unit 114 has inputs coupled to the CAN bus terminal 124 and an output coupled to the receiver output 122 of the CAN transceiver 112. The receiver unit 114 is configured to convert a differential signal on the CAN bus 104 into data for the CAN controller 110.

Figure 2:
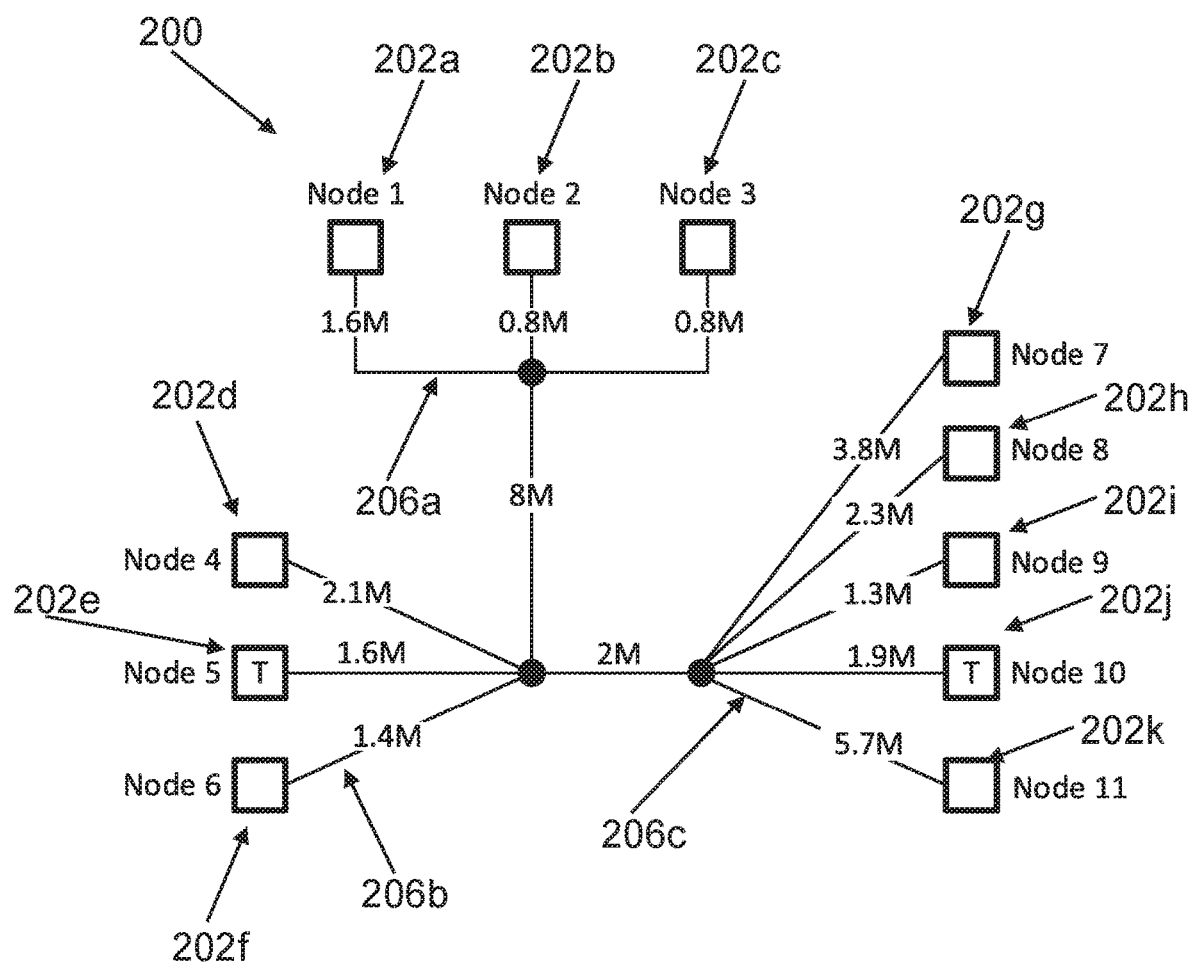
FIG. 2 shows an example CAN network topology.

FIG. 2 illustrates an example CAN network topology 200 comprising a plurality of nodes 202a-k and stubs (e.g., stubs 206a-c). The stubs (e.g., stubs 206a-c) in general need to be short in order to avoid long lasting reflections from open cable ends to be able to meet a higher speed. An example of a CAN network topology 200 is depicted in FIG. 2 with termination resistors located at node 5 (202e) and node 10 (202j) (as indicated by "T").

When any of the nodes (e.g. 1, 2, 3, 7 and 11—nodes 202a,b,c,g and k) that are furthest away from the termination resistors (node 5, 10—nodes 202e,j) start sending data, reflections in the network will cause signal disturbances. These signal disturbances will be problematic when detecting collisions based on voltage threshold.

The slow phase (arbitration) of a CAN XL frame uses the CAN level scheme according to ISO11898-2:2016 (SLOW mode).

Figure 3:
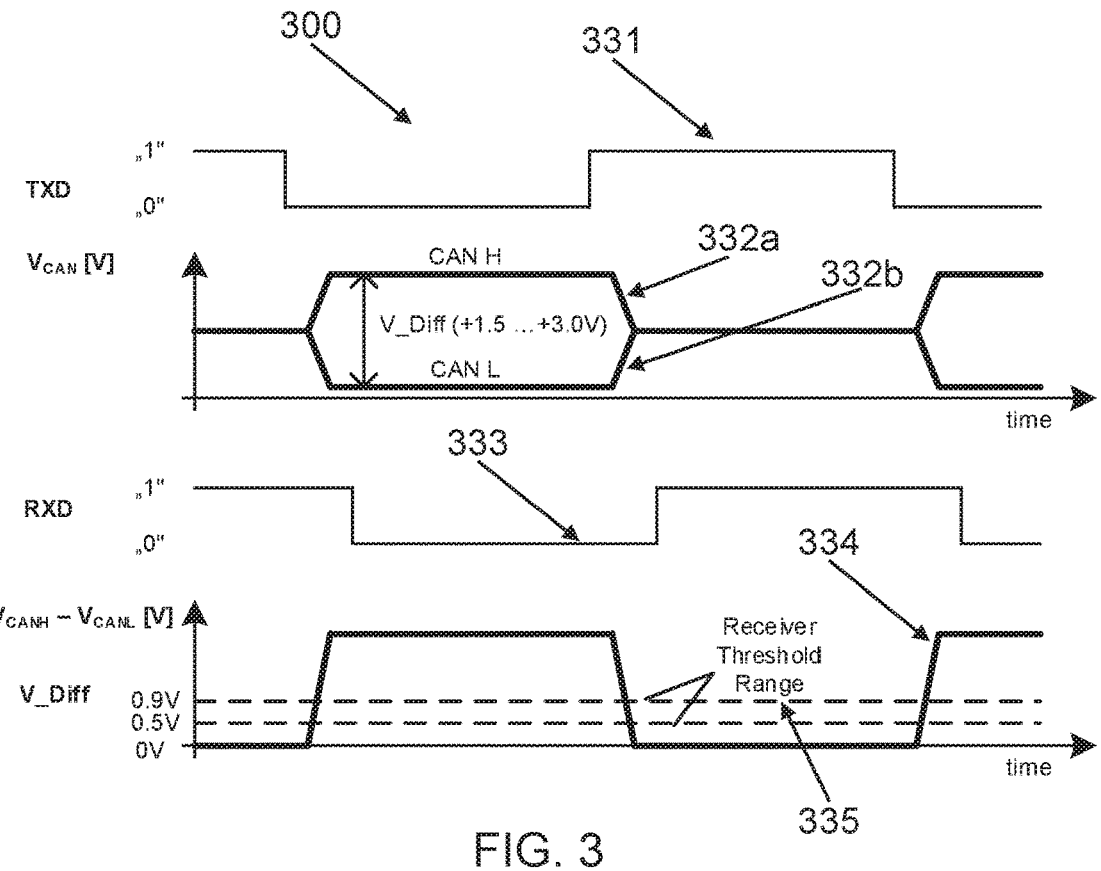
FIG. 3 shows a CAN physical voltage level scheme.

FIG. 3 illustrates a CAN physical voltage level scheme 300 according to ISO11898-2:2016. The CAN physical voltage level scheme 300 is represented by corresponding signals, including a logic level signal on a transmitter input (TXD) 331 of a CAN transceiver, a high CAN bus voltage ($V_{CANH}$) 332a, a low CAN bus voltage ($V_{CANL}$) 332b, a logic level signal on a receiver output (RXD) 333 of the CAN transceiver and a differential voltage (V_Diff) 334. The differential voltage (V_Diff) 334 is defined in the CAN physical voltage level scheme 300 as $V_{CANH}-V_{CANL}$. V_Diff 334 is shown alongside a receiver threshold range 335.

In the CAN physical voltage level scheme 300 a V_Diff 334 value above 0.9V corresponds to the CAN bus being in a dominant state (logic state "0")—compare V_Diff 334 with receiver threshold range 335. Conversely, V_Diff 334 values below 0.5V correspond to the CAN bus being in a recessive state (logic state "1"). Intermediate values of V_Diff 334—i.e., between 0.5V and 0.9V—correspond to an undefined state on the CAN bus.

An objective for CAN XL is that the possible communication speed shall be brought to the maximum of what is physically possible. The level scheme as defined in the ISO11898-2:2016 is not optimized for that purpose due to several reasons. First, the arbitration mechanism needs to make sure that the bus becomes relative high-ohmic (this is why that state is called "recessive") for the logical state "1" (high). This high ohmic state can be overridden by another sender (another node on the network) with a low-ohmic "0" (this is why it is called "dominant"). Second, this same mechanism is used through all the CAN frames to signal a detected error on the bus lines. Any node may override a sender at any time during his recessive bit phases and with that, stop a transmission on the fly. "High ohmic" driven bits are rather slow and have other draw backs in combination with true bus wire harness. Long physical bus cables with multiple branches may create a lot of reflections and may corrupt the high-ohmic bits. This is why CAN XL proposes to use a level scheme and driver strength, which is optimized for maximum signal performance on the bus lines.

Figure 4:
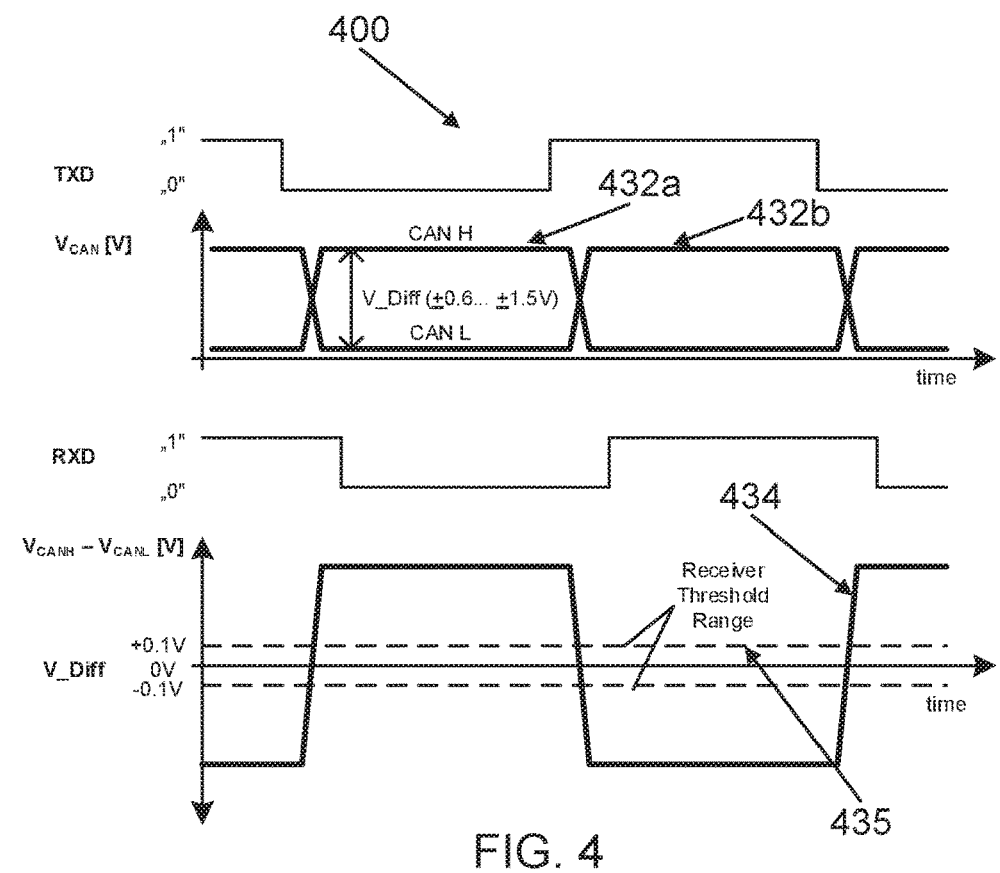
FIG. 4 shows a proposed CAN XL physical voltage level scheme.

FIG. 4 illustrates a proposed CAN XL physical voltage level scheme 400. The proposed CAN XL physical voltage level scheme 400 corresponds to a CAN XL bus level scheme in a fast, data phase mode of operation. The proposed CAN XL physical voltage level scheme 400 is similar to the CAN physical voltage level scheme 300 shown in FIG. 3 in terms of corresponding signals. Key corresponding signals in the proposed CAN XL physical voltage level scheme 400 include a high CAN bus voltage ($V_{CANH}$) 432a, a low CAN bus voltage ($V_{CANL}$) 432b and a differential voltage (V_Diff) 434, defined as $V_{CANH}-V_{CANL}$. The differential voltage (V_Diff) 434 is shown alongside a receiver threshold range 435.

The CAN XL physical voltage level scheme 400 will have three different threshold levels to support. A first threshold (not shown in FIG. 4) is around the well-known ISO11898-2:2016 standard levels between differential voltage (V_Diff) 434 values of +0.5V and +0.9V, used for the backwards compatible CAN arbitration.

The second threshold—represented by the receiver threshold range 435 of ±0.1V in FIG. 4—is related to fast CAN XL data communication around a differential voltage (V_Diff) 434 value of 0V.

The third threshold (not shown in FIG. 4) is used in fast CAN XL data communication on the CAN bus in the negative differential area. The third threshold is typically −0.6 V and has a maximum level that is lower than the minimum level of the second threshold (e.g., −0.3V . . . −0.4V).

Since the Arbitration and bus access stays the same in CAN XL compared with CAN FD (to provide backwards compatibility), a CAN XL Transceiver can make use of the enhanced physical voltage level scheme only after the Arbitration is done, or complete, and the CAN XL ECU (of a particular node) has won the bus access. At that moment in time the CAN XL transceiver (of the node that has won the bus access) may switch to the new level scheme and boost the speed on the bus wires to the physical maximum, for example, in the CAN XL data phase exemplified in FIG. 4. Intentionally, CAN XL does not allow anybody to override data bits, the high ohmic output behaviour could be avoided and all bit levels are driven with optimum strength.

Figure 5:
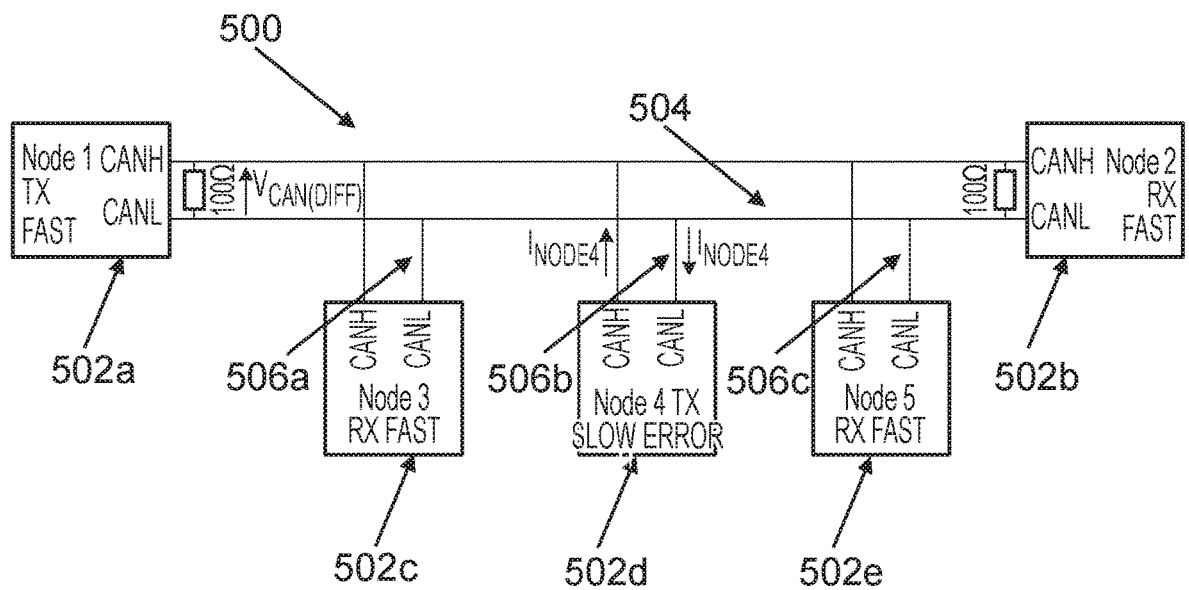
FIG. 5 shows an example schematic block diagram of a CAN XL bus network.

FIG. 5 illustrates an example schematic block diagram of a CAN XL bus network 500. The example network topology shown in FIG. 5 has an end-to-end termination with short stub(s) and thus no significant signal disturbances. The topology of the CAN XL bus network 500 is similar to that described previously with reference to FIG. 1a in that it comprises a plurality of CAN XL nodes, or devices, 502a-e, which are each coupled to a CAN bus 504 for communicating a differential signal between the multiple CAN XL nodes 502a-e via stubs (e.g., stubs 506a-c). Each CAN XL node 502a-d may comprise a CAN XL controller and CAN XL transceiver as described above with reference to FIG. 1b. The CAN bus 504 comprises two signal lines for communicating a differential signal between the plurality of CAN XL nodes 502a-d.

The CAN XL bus network 500 of FIG. 5 differs from the CAN bus network of FIG. 1a in that it is shown in a particular state of operation.

Figure 6:
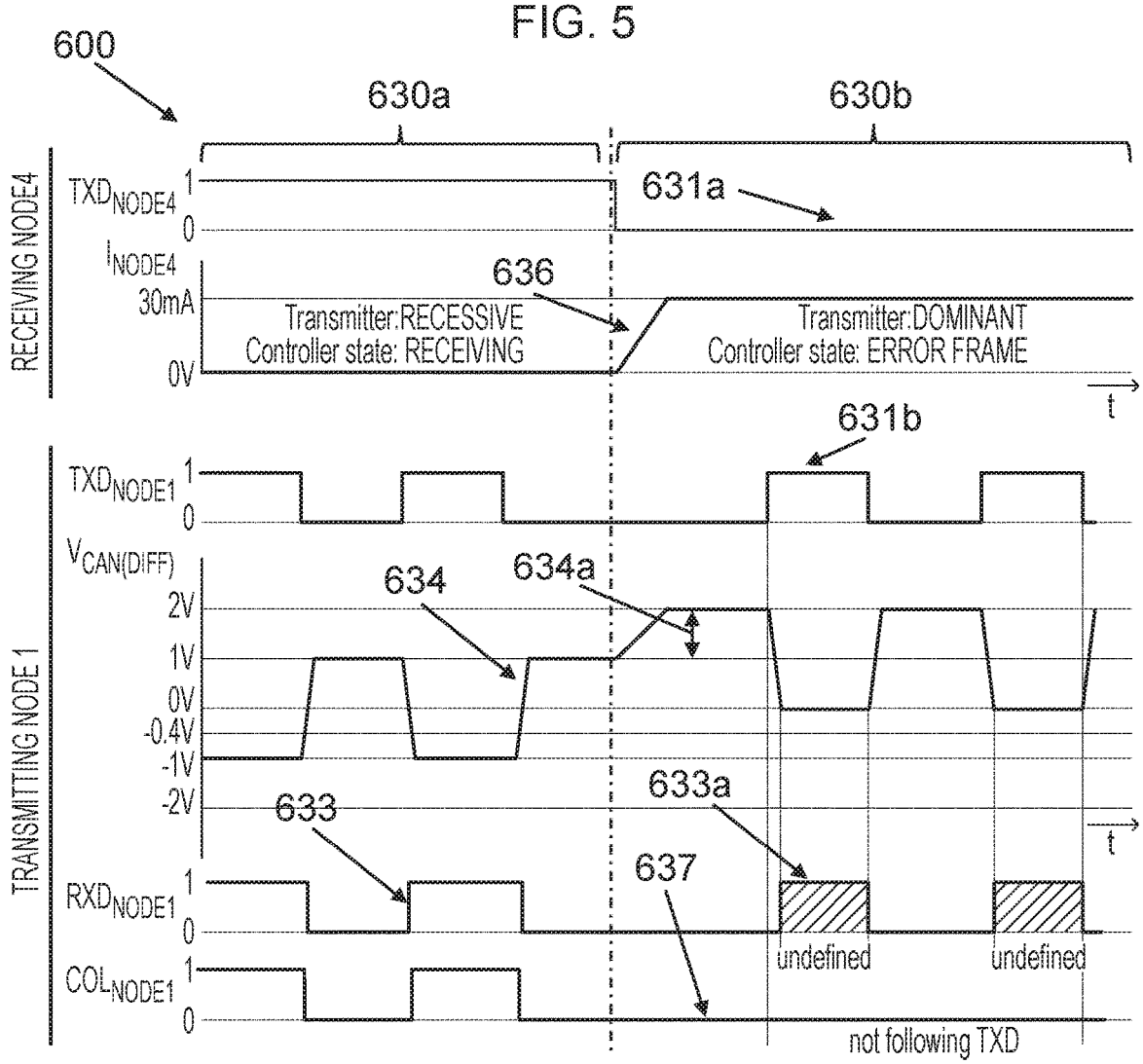
FIG. 6 illustrates a timing diagram for the CAN XL bus network of FIG. 5.

FIG. 6 illustrates a timing diagram 600 for the CAN XL bus network of FIG. 5. Node 1 (502a) has won arbitration and is transmitting during the data phase in the fast mode of CAN XL (TX FAST). All other nodes 502b-e are receiving the data (RX FAST) in a first period 630a. At a certain time, node 4 (502d) has detected an error and its CAN XL controller switched back to slow mode and starts transmitting 'DOMINANT' as an error frame (TX SLOW ERROR) in a second period 630b.

The timing diagram 600 demonstrates a transition from a period changes that occur when the CAN XL bus network of FIG. 5 transitions from the first period 630a to the second period 630b. The timing diagram in FIG. 6 explains in detail what happens in this example. Specifically, the timing diagram 600 shows a logic level signal on a transmitter input ($TXD_{NODE4}$) 631a of a CAN XL transceiver of node 4 (502d) and a current ($I_{NODE4}$) 636 between the node 4 (502d) and the bus 504. The timing diagram 600 also shows a logic level signal on a transmitter input ($TXD_{NODE1}$) 631b of the CAN XL transceiver of node 1 (502a), a CAN differential bus voltage ($V_{CAN(DIFF)}$) 634, a logic level signal on a receiver output ($RXD_{NODE1}$) 633 of the CAN XL transceiver of node 1 (502a) and a comparator output ($COL_{NODE1}$) 637 of a comparator of node 1 (502a).

The timing diagram 600 in the first period 630a and the second period 630b can be generally understood as follows. The first period 630a (i.e., to the left of the dashed line in FIG. 6) corresponds to node 1 (502a) transmitting data to the CAN bus 504. Node 4 (502d) is receiving the data (RX FAST) in the first period. That is, the transmitter of node 4 (502d) is in a 'RECESSIVE' state and its controller is in a 'RECEIVING' state. The data transmitted by node 1 (502a) is represented in the timing diagram 600 by the waveforms of the logic level signal on the transmitter input ($TXD_{NODE1}$) 631b of the CAN XL transceiver, the CAN differential bus voltage ($V_{CAN(DIFF)}$) 634 and the logic level signal on the receiver output ($RXD_{NODE1}$) 633 of the CAN XL transceiver. In the first period 630a the logic level signal on the receiver output ($RXD_{NODE1}$) 633 of the CAN XL transceiver of node 1 (502a) is in sync with the logic level signal on the transmitter input ($TXD_{NODE1}$) 631b of the CAN XL transceiver of node 1 (502a).

The second period 630a (i.e., to the right of the dashed line in FIG. 6) corresponds to node 4 (502d) detecting an error and transmitting 'DOMINANT' as an error frame, while node 1 (502a) continues to transmit data. The combination of node 1 (502a) and node 4 (502d) transmitting data to the CAN bus 504 simultaneously alters the time period and causes and maximum/minimum voltages of the CAN differential bus voltage ($V_{CAN(DIFF)}$) 634 to shift 634a compared with the time period and maximum/minimum voltages of the CAN differential bus voltage ($V_{CAN(DIFF)}$) 634 in the first period 630a.

Specifically, the drive strength of the transmitter in node 4 (502d) is assumed to be the worst case and is shown as a dominant current source of 30 mA. The minimum dominant voltage specified in ISO11898-2:2016 is 1.5V at a minimum load of 50 Ohm. This calculates into a minimum dominant current 636 of 1.5/50=30 mA. This current ($I_{NODE4}$) is provided to the transmitter of node 4 (502d) when node4 (502d) detects an error. That is, node 4 (502d) switches from RX FAST to TX SLOW ERROR as indicated by the change in the logic state of the logic level signal on the transmitter input ($TXD_{NODE4}$) 631a of the CAN XL transceiver of node 4 (502d) from '1' in the first period 630a to '0' in the second period 630b. In this example the voltage swing of the transmitter in node 1 (502a) is chosen as 1V peak and the output driver impedance is 100 Ohm. The impedance seen by the transmitter at node 4 (502d) is 100/3=33.33 Ohm (two 100 Ohm termination resistors and 100 Ohm driver impedance of node 1 (502a) in parallel), which calculates into a differential bus voltage shift of 30*33.33=1V. The differential bus voltage ($V_{CAN(DIFF)}$) 634 of node1 (502a) is now shifted 634a by 1V and consequently the receiver in node 1 (502d) cannot reliably detect level0 on the bus resulting in undefined levels 633a at the RXDNODE1 output pin. In other words, the logic level signal on the receiver output ($RXD_{NODE1}$) 633 of the CAN XL transceiver of node 1 (502a) is no longer in sync with the logic level signal on the transmitter input ($TXD_{NODE1}$) 631b of the CAN XL transceiver of node 1 (502a).

A dedicated comparator may be provided to determine whether a collision has occurred. In particular the presence of a voltage shift 634a on the CAN differential bus voltage ($V_{CAN(DIFF)}$) 634 may indicate that a collision has occurred. In this example, a comparator with a threshold of −0.4V is chosen to lie roughly in the middle of the lowest receiver threshold of −0.1V and a level0 drive voltage of −0.6V. The output ($COL_{NODE1}$) 637 of the comparator follows the $TXD_{NODE1}$ signal 631b in the case of no collision in the first period 630a. For the case of the voltage shift 634a that is due to a collision, in the second period 630b, the comparator output ($COL_{NODE1}$) 637 is static low, which does not follow the $TXD_{NODE1}$ signal. Accordingly, collisions on the CAN bus 504 may be detected by comparing the output ($COL_{NODE1}$) 637 of the comparator with the $TXD_{NODE1}$ 631b signal. A collision is detected when the output ($COL_{NODE1}$) 637 of the comparator does not match the $TXD_{NODE1}$ 631b signal.

Figure 7:
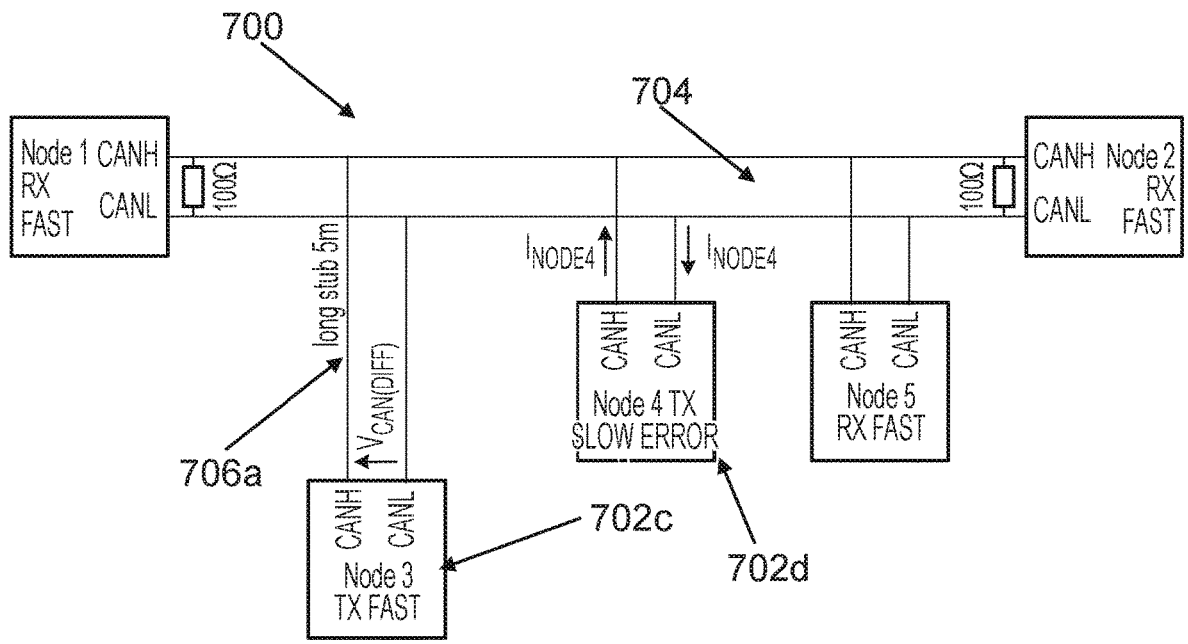
FIG. 7 shows a further example schematic block diagram of a CAN XL bus network.

FIG. 7 illustrates a further example schematic block diagram of a CAN XL bus network 700. The CAN XL bus network 700 is similar to the CAN XL bus network 500 described previously with reference to FIG. 5, except that node 3 (702c) is coupled to the CAN bus 704 via a long stub 706a. As such, the CAN XL bus network 700 can be taken to correspond to a network topology where reflections may be present on the CAN bus 704, for example due to a disadvantageous network topology.

As illustrated in FIG. 7, node 3 (702c) is connected to the network via a long stub 706a, e.g. 5 meters, and this may cause signal disturbance (reflections).

The CAN XL bus network 700 is shown in a particular state of operation. Node 3 (702c) has won arbitration and is transmitting during the data phase in the fast mode (TX FAST). All other nodes are receiving the data (RX FAST) in a first period. At a certain time, node 4 (702d) has detected an error and its CAN XL controller switched back to slow mode and starts transmitting dominant as an error frame (TX SLOW ERROR) in a second period.

Figure 8:
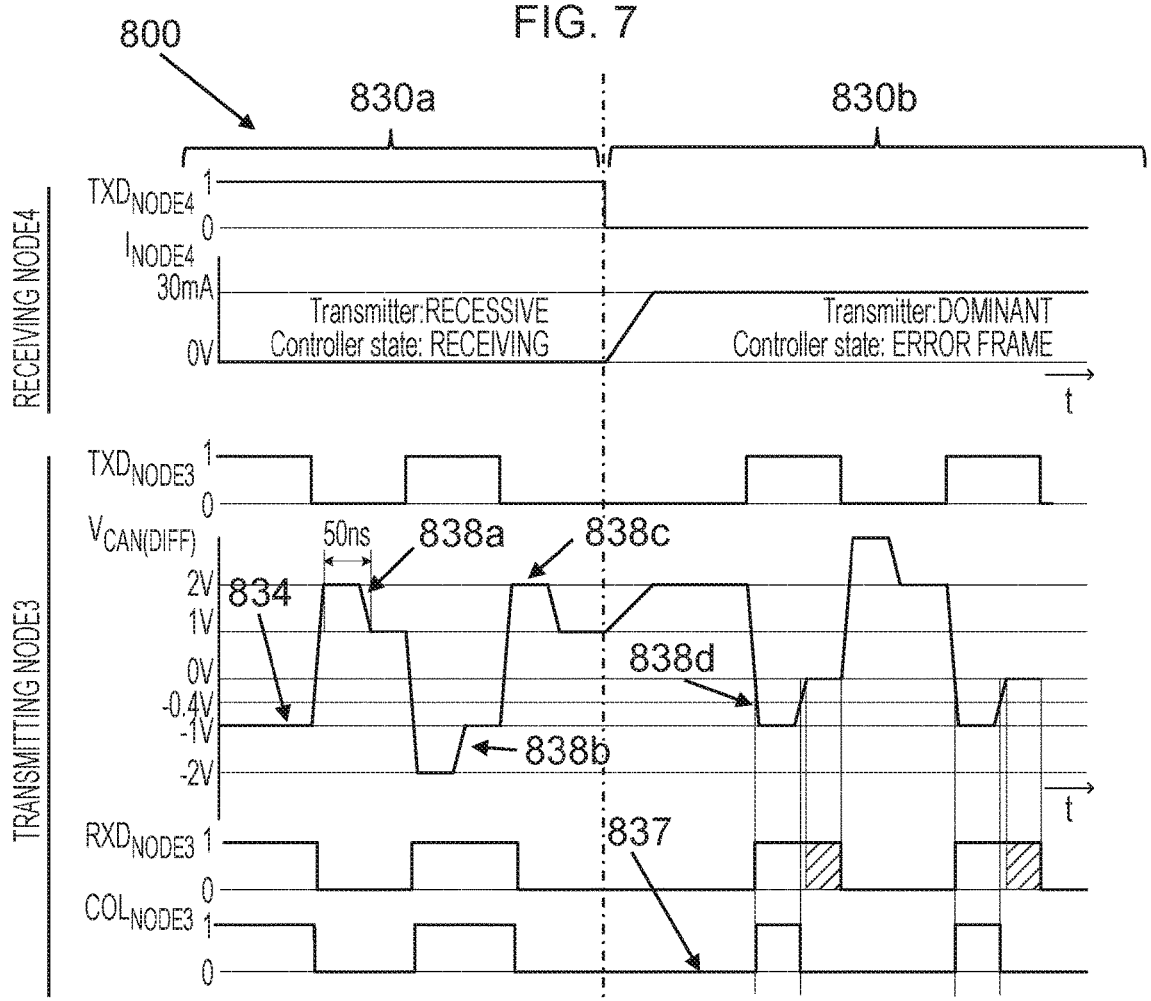
FIG. 8 illustrates a timing diagram corresponding to the CAN XL bus network of FIG. 7.

FIG. 8 illustrates a timing diagram 800 for the CAN XL bus network 700 of FIG. 7. The timing diagram in FIG. 8 explains in detail what happens in this example. The timing diagram 800 is similar to the timing diagram 600 described previously with reference to FIG. 6, except that node 3 (702c) is transmitting (TX FAST) instead of node 1 (502a) as in FIG. 6, and that reflections or overshoots (e.g., overshoots 838a-d), are now present on the CAN differential bus voltage ($V_{CAN(DIFF)}$) 834 at node 3 (702c). The reflections or overshoots are due to the length of the stub 706a and are present in both the first period 830a and the second period 830b.

In the first period 830a of the timing diagram 800, since node 3 (702c) is transmitting into a long stub 706a the impedance seen by the transmitter during a transition (e.g., from logic level '1' to logic level '0') is not 50 Ohm but the cable impedance only of 100 Ohm. This results in a factor 1.5 higher voltage swing on the CAN differential bus voltage ($V_{CAN(DIFF)}$) 834 when driving with an output impedance of 100 Ohm, represented by the first change in the CAN differential bus voltage ($V_{CAN(DIFF)}$) 834 from −1V to 2V. The first (i.e., left-most in FIG. 8) change in the CAN differential bus voltage ($V_{CAN(DIFF)}$) 834 from −1V to 2V causes an overshoot 838a in the CAN differential bus voltage ($V_{CAN(DIFF)}$) 834, the overshoot 838a having a duration of 2 times the stub length times the propagation delay in a twisted pair (2*5 m*5 ns=50 ns). The overshoot 838a-c in the first period 830a do not impose a problem for the signal integrity when there is no collision on the bus because there is enough signal to noise margin with a receiver threshold of 0V. But the overshoots in the second period 830b (e.g., overshoot 838d) do pose a problem when there is a collision on the bus. Specifically, the comparator output $COL_{NODE3}$ 837 is not reliable anymore since it also toggles (e.g., from logic level '0' to logic level '1') while there is a collision on the CAN bus 704 (i.e., during the second period 830b of the timing diagram 800 when node 4 (702d) is transmitting to the CAN bus 704 at the same time as node 3 (702c).

In other words, a collision detection comparator having a pre-determined CAN differential bus voltage toggle threshold (e.g., −0.4V as in examples discussed above) may be inaccurate when two nodes of a CAN XL bus network 700 are transmitting simultaneously to the CAN bus.

Figure 9:
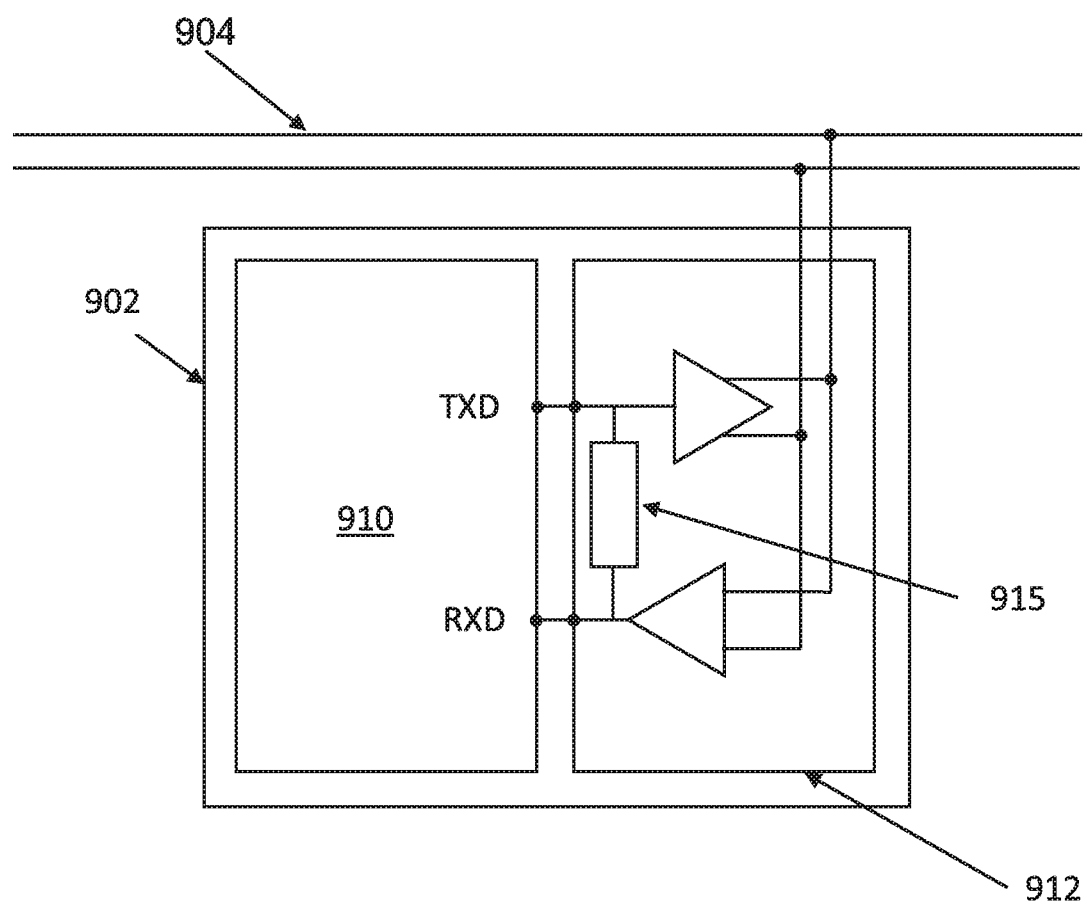
FIG. 9 illustrates a node for a CAN network, the node comprising a CAN unit.

FIG. 9 illustrates a node for a CAN network. The CAN node 902 comprises a CAN controller 910 and a CAN transceiver 912. The node is similar to that described previously with reference to the CAN node in FIG. 1b except that in this example the node further comprises a CAN unit 915. The CAN transceiver as a whole may be considered to be a CAN unit for communicating with a CAN bus 904. In this illustrated example, the CAN unit 915 is comprised by, or provides, the CAN transceiver 912. Alternatively, the CAN unit may be comprised by, or provided by, the CAN controller 910 or elsewhere in the CAN node 902.

CAN unit 915 is configured to: detect a transmit signal edge on a transmit signal for a CAN transceiver; detect a corresponding receive signal edge on a receive signal for a CAN controller of the CAN transceiver; and detect a collision on the CAN bus based on a propagation delay between the transmit signal edge and the corresponding receive signal edge.

Figure 10:
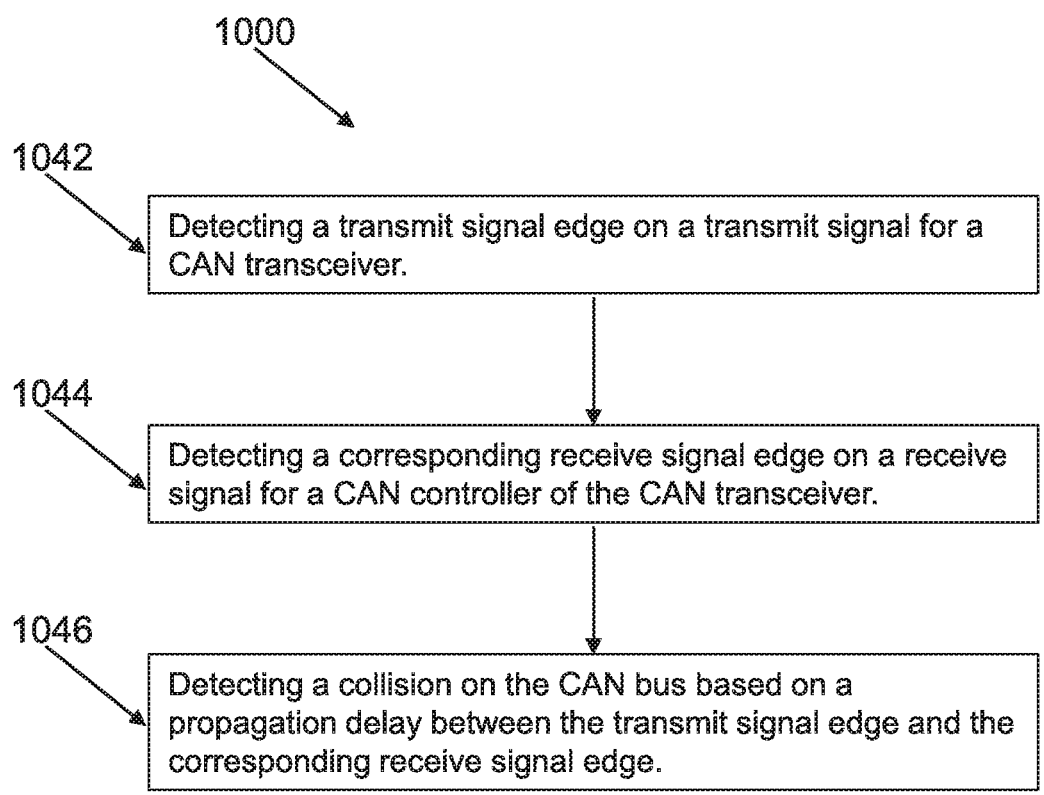
FIG. 10 illustrates a method of operating the CAN unit of the CAN node of FIG. 9.

FIG. 10 illustrates a method 1000 for operating the CAN unit 902 of FIG. 9. The method comprises: detecting 1042 a transmit signal edge on a transmit signal for a CAN transceiver; detecting 1044 a corresponding receive signal edge on a receive signal for a CAN controller of the CAN transceiver; and detecting 1046 a collision on the CAN bus 904 based on a propagation delay between the transmit signal edge and the corresponding receive signal edge.

As described in detail below, detecting a collision on a CAN bus may be based on:

- a first propagation delay between corresponding signal edges on a logic level signal at a transmitter input (TXD) of a CAN transceiver 912 (which is the same signal as at the transmitter output (TXD) of a CAN controller 910) and a logic level signal at a receiver output (RXD) of the CAN transceiver 912 (which is the same signal as at the receiver input (RXD) of a CAN controller 910);
- a second propagation delay between corresponding subsequent signal edges on the logic level signal at a transmitter input (TXD) of the CAN transceiver and the logic level signal on a receiver output (RXD) of the CAN transceiver; or
- both the first propagation delay and the second propagation delay. Such aspects of the present disclosure may refer to measuring the symmetry of the TXD to RXD propagation delay to detect collisions.

In some examples, the CAN unit 902 may be further configured to detect the collision during a fast data phase of CAN XL operation. The CAN unit 902 may be further configured to switch to a slow, arbitration mode of operation in response to detecting a collision on the CAN bus 904.

The operation of a CAN unit 902 of FIG. 9 in the CAN XL bus network 500 as described in FIG. 5, using the method of FIG. 10 for example, is further explained below with reference to FIGS. 11*a* and 11*b*.

Figure 11A:
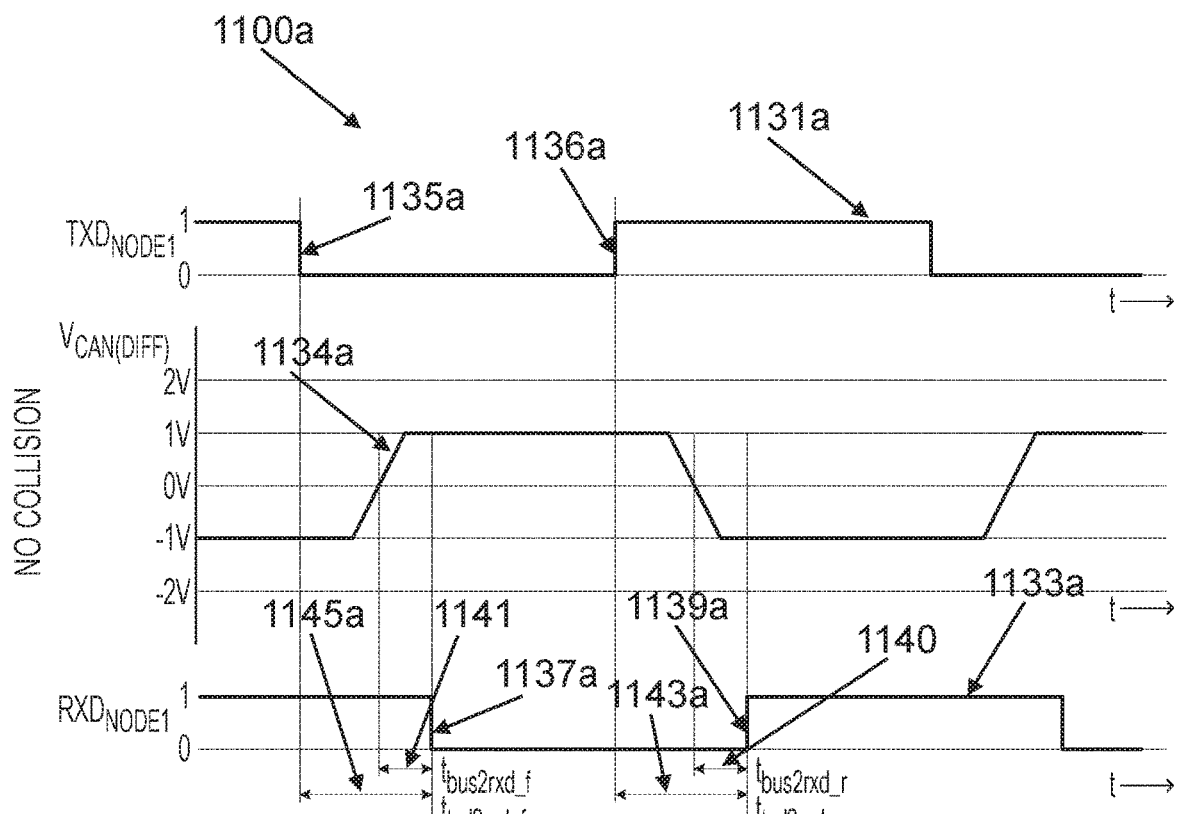
FIGS. 11a, 11b illustrate a further timing diagram corresponding to the CAN XL bus network of FIG. 5.
Figure 11B:
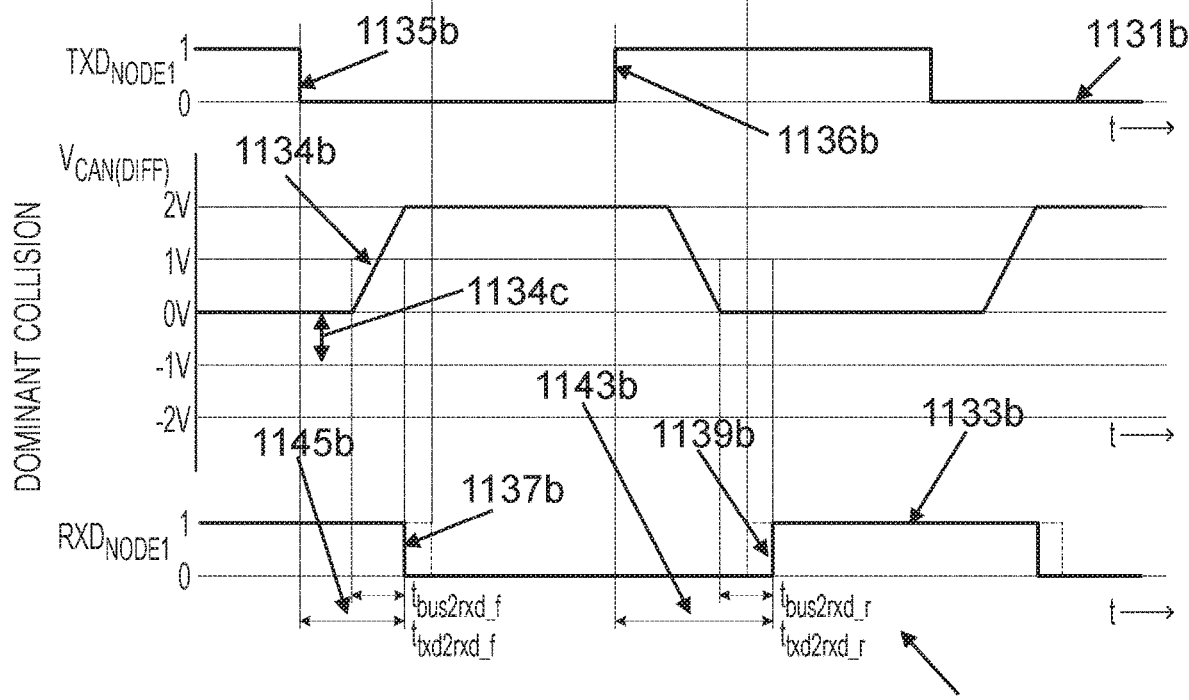

FIGS. 11*a* and 11*b* illustrate timing diagrams 1100*a,b* for the CAN XL bus network 500 of FIG. 5. The timing diagram of FIG. 11*a* relates to a case where bus collision is not present. The timing diagram of FIG. 11*b* relates to a case where a bus collision is present. Each timing diagram 1100 includes corresponding signals of the CAN transceiver of node 1 (502*a*). The signals include a logic level signal on a transmitter input (TXD$_{NODE1}$) 1131*a,b* of a CAN transceiver, a CAN differential bus voltage (V$_{CAN(DIFF)}$) 1134*a,b* and a logic level signal on a receiver output (RXD$_{NODE1}$) 1133*a,b*.

The timing diagrams 1100*a,b* also show falling and rising edges on the logic level signal on the transmitter input (TXD$_{NODE1}$) of node 1 (502*a*) 1131*a,b* (e.g., falling edges 1135*a,b* and rising edges 1136*a,b*) and on the logic level signal on the receiver output (RXD$_{NODE1}$) 1133*a,b* of node 1 (502*a*) (e.g., falling edges 1137*a,b* and rising edges 1139*a,b*).

The timing diagram 1100*a* of FIG. 11*a* shows the logic level signal on the transmitter input (TXD$_{NODE1}$) 1131*a* of node 1 (502*a*), the CAN differential bus voltage V$_{CAN(DIFF)}$ 1134*a* and the logic level signal on the receiver output (RXD$_{NODE1}$) 1133*a* of node 1 (502*a*) in the case of no collision on the CAN bus 504. The transmitter has a certain propagation delay for the rising and falling edge (not drawn in the timing diagram). Also, the receiver has a certain propagation delay for the rising (t$_{bus2rxd\_r}$ 1140) and falling edge (t$_{bus2rxd\_f}$ 1141). The propagation delay from the logic level signal on the transmitter input (TXD$_{NODE1}$) 1131*a* of node 1 (502*a*) to the logic level signal on the receiver output input (RXD$_{NODE1}$) 1133*a* of node 1 (502*a*) is the combined delay of the transmitter and receiver and is shown as a rising edge propagation delay (t$_{txd2rxd\_r}$) 1143*a* for the rising edge (i.e., from rising edge 1136*a* to rising edge 1139*a*) and a falling edge propagation delay (t$_{txd2rxd\_f}$) 1145*a* for the falling edge (i.e., from falling edge 1135*a* to falling edge 1137*a*). The symmetry for the logic level signal on the transmitter input (TXD$_{NODE1}$) 1131*a* of node 1 (502*a*) to the logic level signal on the receiver output (RXD$_{NODE1}$) 1133*a* of node 1 (502*a*) delay is specified as t$_{tx2xd\_sym}$=t$_{txd2rxd\_f}$−t$_{txd2rxd\_r}$. The transmitter is designed to be fully balanced, resulting in a bus signal which is symmetrical around the receiver threshold at 0V. When there is only one transmitter active on the CAN bus 504 this results in a typical value for t$_{txd2rxd\_sym}$=0. For CAN XL there is a requirement defined what the limits are for the symmetry of logic level signal on the transmitter input (TXD) to the logic level signal on the receiver output (RXD) delay (currently specified between −15 ns and +15 ns).

The timing diagram 1100*b* of FIG. 11*b* is in the case of another node transmitting a dominant level at the same time (modelled with a current source of 30 mA) which results in a collision on the bus. The voltage shift 1134*c* due to the collision, which causes the CAN differential bus voltage (V$_{CAN(DIFF)}$) 1134*b* to rise to a maximum of 2V instead of 1V in the case of no voltage shift, for example, results in an asymmetry of the receiver propagation delay. This asymmetry can be seen by comparing the duration of the falling edge propagation delay (t$_{txd2rxd\_f}$) 1145*b* with the duration of t$_{txd2rxd\_r}$ 1143*b*. The value of t$_{txd2rxd\_sym}$ depends on the slew rate of the bus signal (dV$_{CAN(DIFF)}$/dt) and the dc shift (V$_{DC(COLL)}$) due to the collision. t$_{txd2rxd\_sym}$=2*V$_{DC(COLL)}$/(dV$_{CAN(DIFF)}$/dt).

Assuming the following requirements of CAN XL: −15 ns<t$_{txd2rxd\_sym}$<+15 ns and a minimum V$_{DC(COLL)}$=1V, to be able to detect a collision considering the allowable specified spread, the asymmetry shift due to the collision needs to be minimum 30 ns (2×15 ns) to prevent false collision detects. That is, in the context of these requirements 30 ns can be interpreted as a threshold that t$_{txd2rxd\_sym}$ must be equal to or exceed to indicate a collision. This calculates in to a maximum dV$_{CAN(DIFF)}$/dt=2V/30 ns=66.7 mV/ns (currently CAN XL specifies a maximum of 61 mV/ns). With a typical voltage swing of 2Vpp (peak-to-peak) the minimum slope time (between 20% and 80%-->60% swing-->factor 0.6) allowed on the bus is 0.6*2V/66.7 mV/ns=18 ns. The current electrical specification for CAN XL is in a proposed state, but there is a dependency between DC voltage shift, maximum asymmetry and maximum slew rate (related to minimum slope time) to be able to detect a collision.

Accordingly, in some examples a collision on the CAN bus 904 of FIG. 9 may be detected by the CAN unit 902 based on a plurality of propagation delays 1143*b*, 1145*b* between respective signal edges 1135*b*, 1136*b* on the transmit signal 1131*b* and corresponding signal edges 1137*b*, 1139*b* on the receive signal 1133*b*. The respective signal edges 1135*b*, 1136*b* on the transmit signal 1131*b* may be referred to as a first transmit signal edge 1135*b* and a second transmit signal edge 1136*b*, and the corresponding signal edges 1137*b*, 1139*b* on the receive signal 1133*b* may be referred to as a first receive signal edge 1137*b* and a second receive signal edge 1139*b*. In this example, the first receive signal edge 1137*b* and first transmit signal edge 1135*b* are both falling edges and the second receive signal edge 1139*b* and the second transmit signal edge 1136*b* are both rising edges.

In these examples, the CAN unit 902 may be further configured to: detect a second transmit signal edge 1136*b*; detect a second receive signal edge 1139*b* that corresponds to the second transmit signal edge 1136*b*; determine a first propagation delay 1145b based on a period between the first transmit signal edge 1135b and the first receive signal edge 1137b; determine a second propagation delay 1143b based on a period between the second transmit signal edge 1136b and the second receive signal edge 1139b; detect a collision on the CAN bus 904 based on a comparison between the first propagation delay 1145b and the second propagation delay 1143b. In some examples a collision may be detected when a difference between the first propagation delay 1145b and the second propagation delay 1143b is greater than a threshold.

In other examples a collision may be detected when the first and/or second propagation delays 1143b, 1145b exceeds a threshold. The threshold may be a time period of at least the range symmetry specification value. That is, a period of time defined within the communication protocol which defined the maximum difference that is permitted for the communication protocol.

If the network topology is not perfectly terminated and when there are reflections present in the bus signal the collision can still be reliably detected. This is explained according to FIG. 12 with reference to the CAN XL bus network 700 shown in FIG. 7.

Figure 12A:
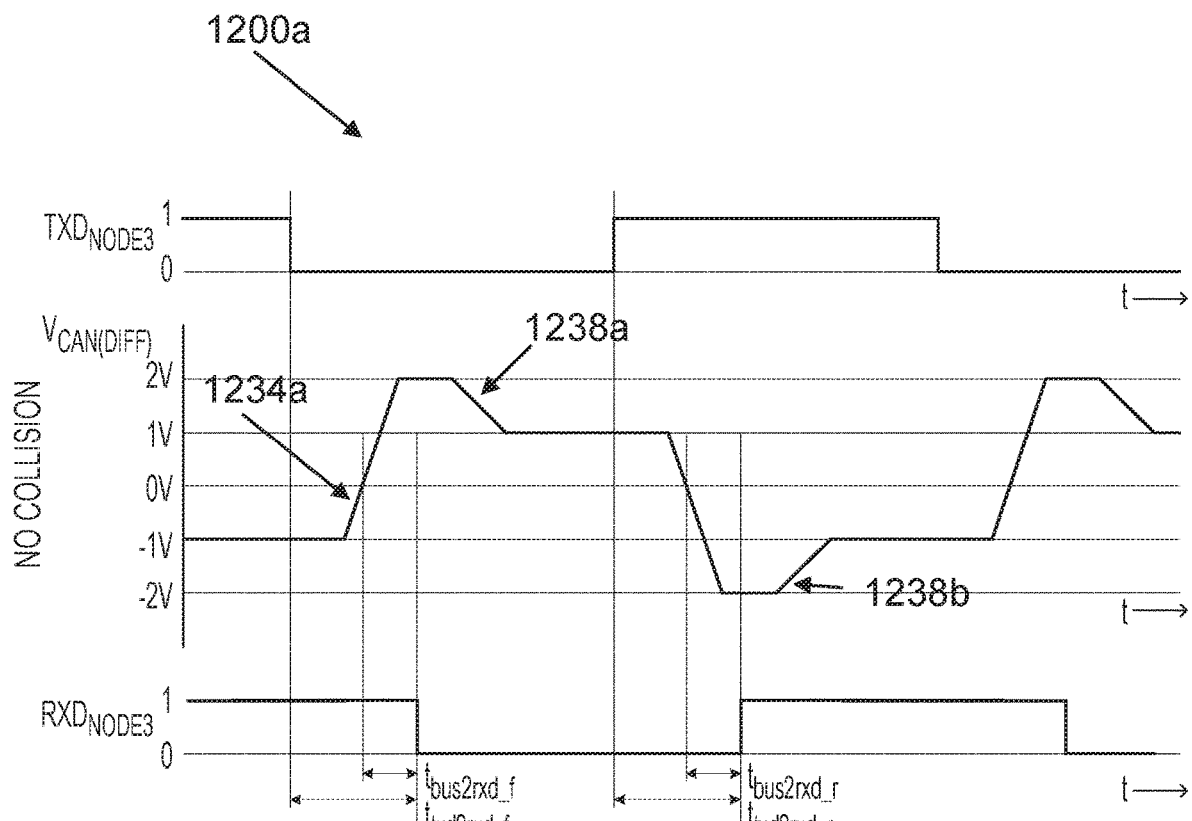
FIGS. 12a, 12b illustrate a further timing diagram corresponding to the CAN XL bus network of FIG. 7.
Figure 12B:
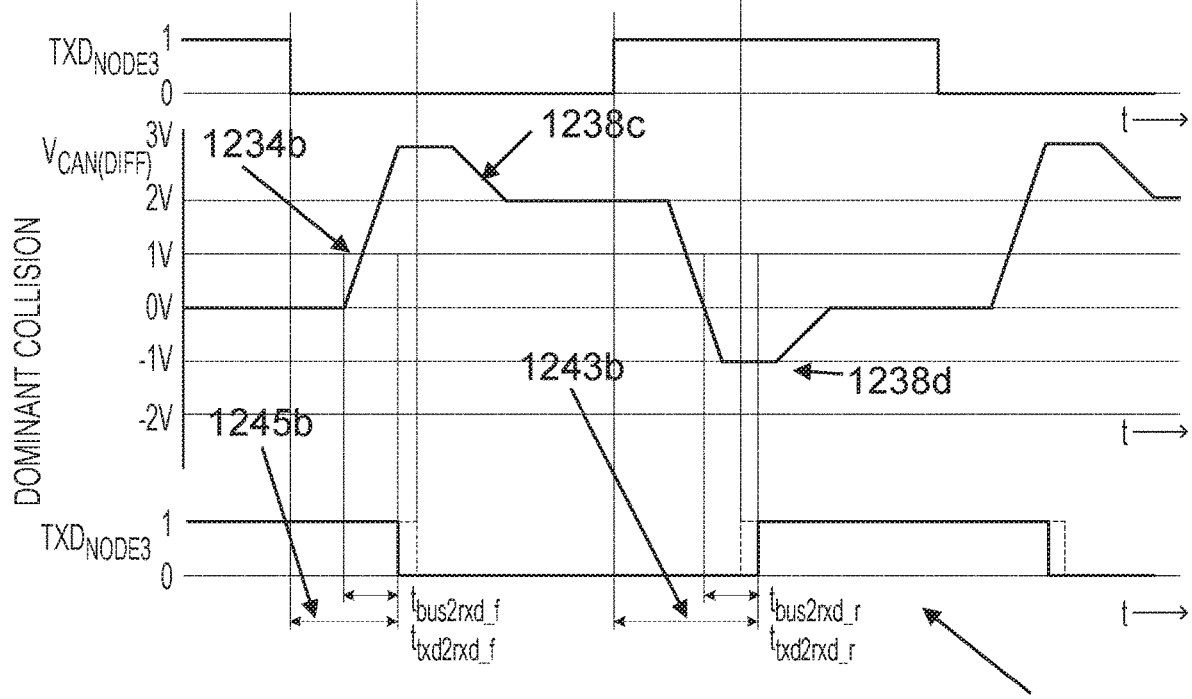

FIGS. 12a and 12b respectively illustrate timing diagrams 1200a,b that are similar to the timing diagrams 1100a,b described above with reference to FIGS. 11a and 11b, except that they relate to signals of node 3 (702c) of the CAN XL bus network of FIG. 7 instead of node 1 (502a) of the CAN XL bus network of FIG. 5. That is, overshoots (e.g., overshoots 1238a-d) are now present on the CAN differential bus voltage ($V_{CAN(DIFF)}$) 1234a,b because of the long stub 706a of node 3 (702c). The reflections on the CAN bus 704, as represented by the overshoots 1238a-d, do not affect the propagation delay $t_{txd2rxd\_r}$ 1243b and the falling edge propagation delay $t_{txd2rxd\_f}$ 1245b. Accordingly, the reflections do not have an impact on the symmetry ($t_{txd2rxd\_sym} = t_{txd2rxd\_f} - t_{txd2rxd\_r}$) shift due to the collision and the collision can still be reliably detected.

If the dominant transmitter on the bus has a higher driver strength than 30 mA, the DC shift to the CAN differential bus voltage ($V_{CAN(DIFF)}$) will be higher and as result the RXD comparator of node 3 (702c), in particular, the receiver, might switch on the reflection. This is explained in FIG. 13.

Figure 13:
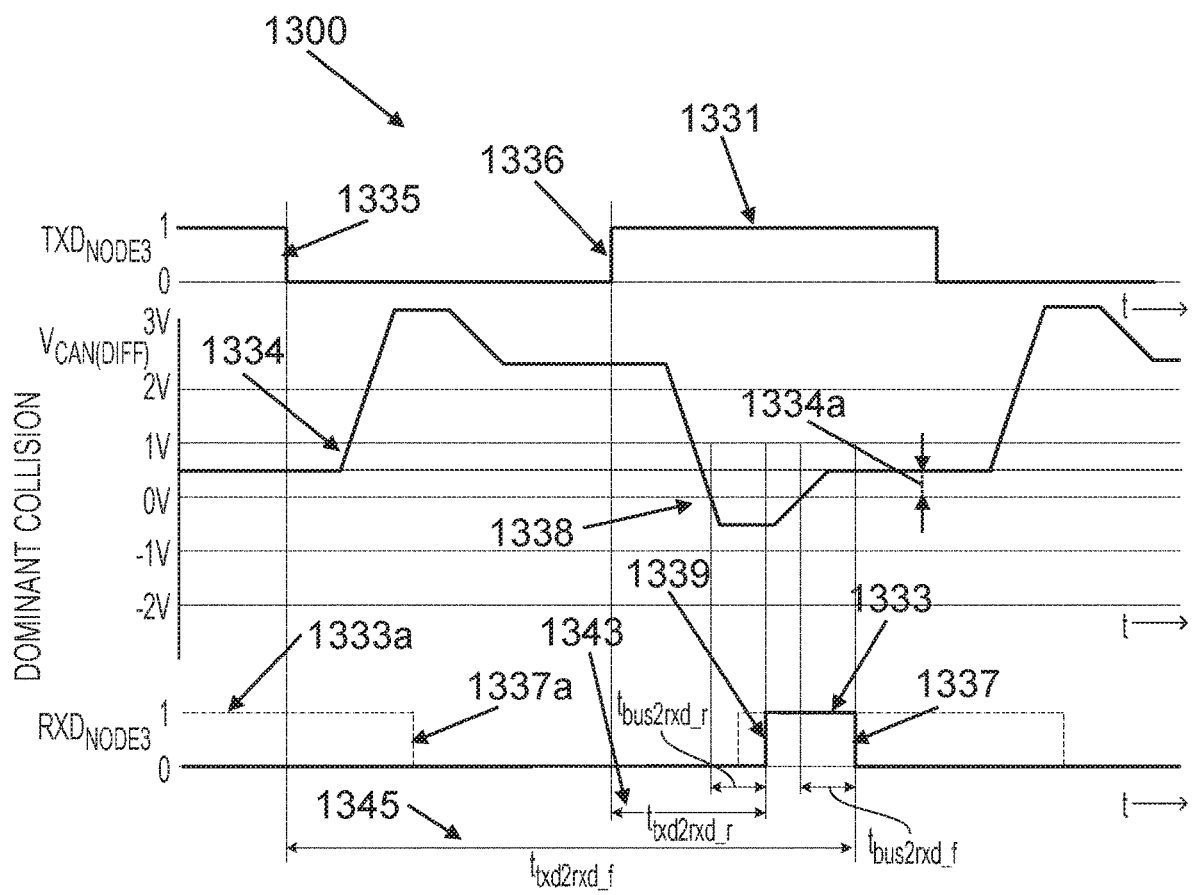
FIG. 13 illustrates a further timing diagram corresponding to the CAN XL bus network of FIG. 7.

FIG. 13 illustrates a timing diagram 1300 that is similar to the timing diagrams 1100a,b and 1200b described above with reference to FIGS. 11a,b and 12b. The signals of timing diagram 1300 include: a logic level signal on a transmitter input ($TXD_{NODE3}$) 1331 of a CAN transceiver of node 3 (702c); a CAN differential bus voltage ($V_{CAN(DIFF)}$) 1334, that, although similar to the CAN differential bus voltage ($V_{CAN(DIFF)}$) 1234b of FIG. 12, is now subject to a DC shift 1334a; a logic level signal on a receiver output ($RXD_{NODE3}$) 1333 of the CAN transceiver of node 3 (702c) in the case of a DC shift 1334a; and, as a reference, a logic level signal on a receiver output ($RXD_{NODE3}$) 1333a of the CAN transceiver of node 3 (702c) in the case of no DC shift.

The signals of timing diagram 1300 also include falling 1335 and rising 1336 signal edges on the logic level signal on the transmitter input ($TXD_{NODE3}$) 1331 of a CAN transceiver of node 3 (702c), falling 1337 and rising 1339 signal edges on the logic level signal on the receiver output ($RXD_{NODE3}$) 1333 of the CAN transceiver of node 3 (702c) for the case of a DC shift 1334a, and a falling 1337a signal edge on the logic level signal on the receiver output ($RXD_{NODE3}$) 1333a of the CAN transceiver of node 3 (702c) for the case of no DC shift.

As indicated above, the DC shift 1334a to the CAN differential bus voltage ($V_{CAN(DIFF)}$) 1334 is caused by the dominant transmitter on the bus having a higher driver strength then than 30 mA. Consequently, the CAN differential bus voltage ($V_{CAN(DIFF)}$) 1334 in the timing diagram 1300 of FIG. 13 has a baseline value of approximately 0.5V; in contrast, the CAN differential bus voltage ($V_{CAN(DIFF)}$) 1234b in FIG. 12b has a baseline value of 0V.

Prior to a collision on the CAN bus, an effect caused by the DC shift 1334a to the CAN differential bus voltage ($V_{CAN(DIFF)}$) 1334 is that the that the logic level signal on the receiver output ($RXD_{NODE3}$) 1333 of the CAN transceiver of node 3 (702c) is logic level '0' rather than logic level '1'. Compare with the logic level signal on the receiver output ($RXD_{NODE3}$) 1333a of the CAN transceiver of node 3 (702c) in the case of no DC shift, where both signals are initially at logic level '1'. Accordingly, a further consequence of the DC shift 1334a to the CAN differential bus voltage ($V_{CAN(DIFF)}$) 1334 is the absence of what would otherwise have been a signal edge on the receiver signal that corresponds to a signal edge on the transmitter signal. That is, a first falling signal edge 1335 on the logic level signal on the transmitter input ($TXD_{NODE3}$) 1331 of a CAN transceiver of node 3 (702c) is followed in time by a non-corresponding first rising edge 1339 on the logic level signal on the receiver output ($RXD_{NODE3}$) 1333 of the CAN transceiver of node 3 (702c), instead of a corresponding falling edge 1337a on the logic level signal on the receiver output ($RXD_{NODE3}$) 1333a of the CAN transceiver of node 3 (702c) in the case of no DC shift. The falling edge 1337 on the logic level signal on the receiver output ($RXD_{NODE3}$) 1333 of the CAN transceiver of node 3 (702c) that corresponds to the falling edge 1335 on the logic level signal on the transmitter input ($TXD_{NODE3}$) 1333 of the CAN transceiver of node 3 (702c) occurs after the receiver of the CAN transceiver of node 3 (702c) has 'toggled' during a reflection 1338.

Detecting a collision on a CAN bus based only on a plurality of propagation delays between respective signal edges on a transmit signal and corresponding signal edges on a receive signal may, in view of the above, be unreliable in view of the timing diagram 1300 of FIG. 13 described above. In the present disclosure, a collision on a CAN bus may also be detected based on an absolute propagation delay between a signal edge on a transmit signal and a corresponding signal edge on a receive signal that occurs after a non-corresponding signal edge on the receive signal. In some examples, a collision on a CAN bus may be detected when an absolute propagation delay as described above is higher than a specified maximum time. The specified maximum time may be based on the requirements of the communication protocol under which the CAN network is operating.

In the timing diagram 1300 of FIG. 13, for example, a collision may be detected based on an absolute propagation delay between the first falling signal edge 1335 on the logic level signal on the transmitter input ($TXD_{NODE3}$) 1331 of the CAN transceiver of node 3 (702c) and the first falling edge 1337 on the logic level signal on the receiver output ($RXD_{NODE3}$) 1333 of the CAN transceiver of node 3 (702c), where the first falling edge 1337 on the logic level signal on the receiver output ($RXD_{NODE3}$) 1333 occurs after the first rising edge 1339 on the logic level signal on the receiver output ($RXD_{NODE3}$) 1333.

As an alternative, a collision may be detected based on an absolute propagation delay between the first rising signal edge 1336 on the logic level signal on the transmitter input (TXD$_{NODE3}$) 1331 of the CAN transceiver of node 3 (702*c*) and the first rising edge 1339 on the logic level signal on the receiver output (RXD$_{NODE3}$) 1333 of the CAN transceiver of node 3 (702*c*).

In summary, a higher DC shift on the bus (such that the RXD comparator will be at static "1") can also be detected as a collision when the (absolute) falling edge propagation delay t$_{txd2rxd\_f}$ 1345 time or the rising edge propagation delay (t$_{txd2rxd\_r}$) 1343 is above a certain maximum time. This may property may be used as a primary detection mechanism. In such scenarios, the asymmetry t$_{txd2rxd\_sym}$=t$_{txd2rxd\_f}$−t$_{txd2rxd\_r}$ is now a large value because the bit time is part of the falling edge propagation delay (t$_{txd2rxd\_f}$) 1345 time. The asymmetry t$_{txd2rxd\_sym}$=t$_{txd2rxd\_f}$−t$_{txd2rxd\_r}$ may also be used in such examples to detect a collision on the bus, albeit as a secondary detection mechanism to the primary detection mechanism.

The implementation of the present disclosure may be digital (asynchronous or synchronous) or analog. An example of a synchronous digital implementation is explained with respect to the flow chart 1400 shown in FIG. 14.

Figure 14:
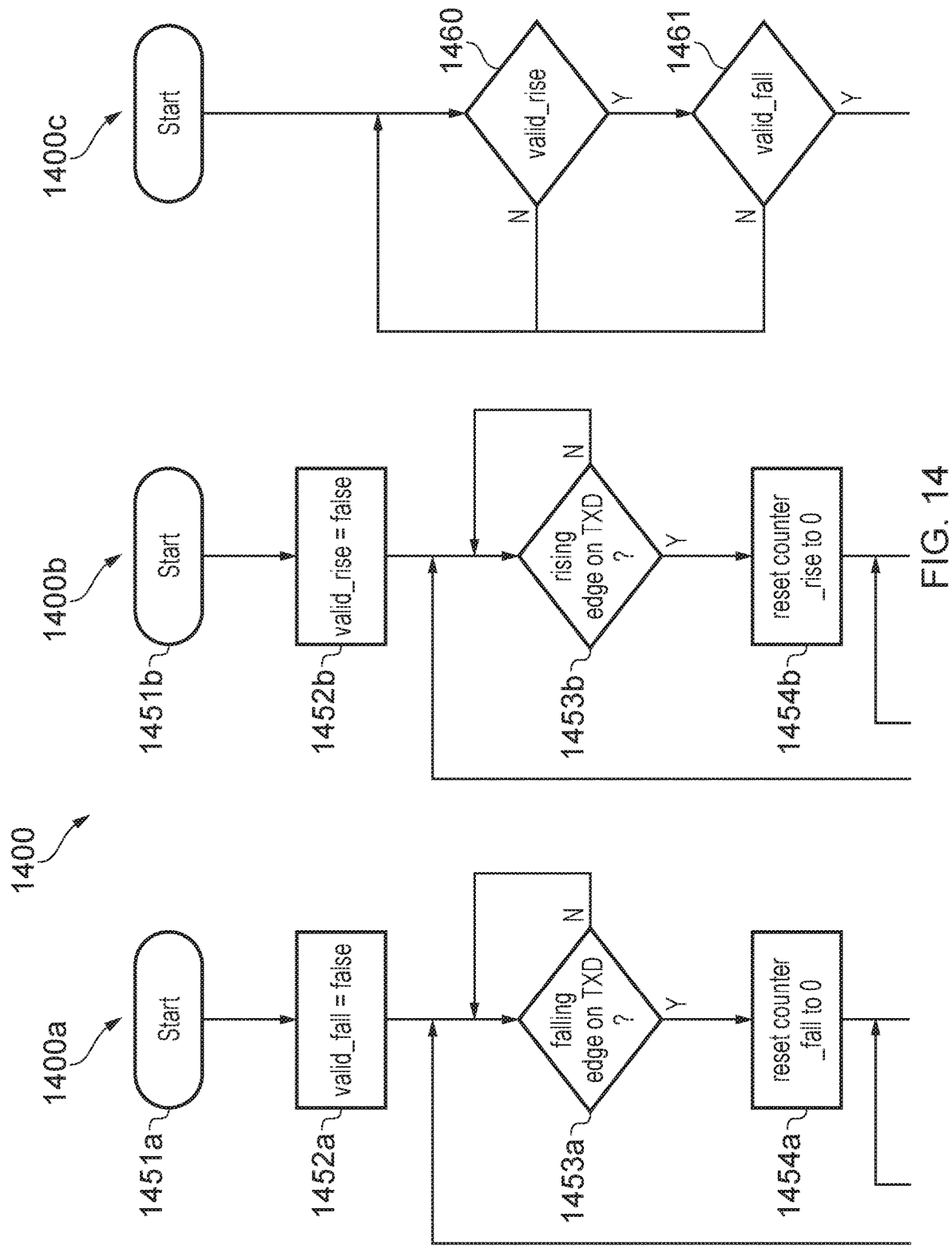
FIG. 14 shows an example digital implementation of the disclosure.
Figure 14:
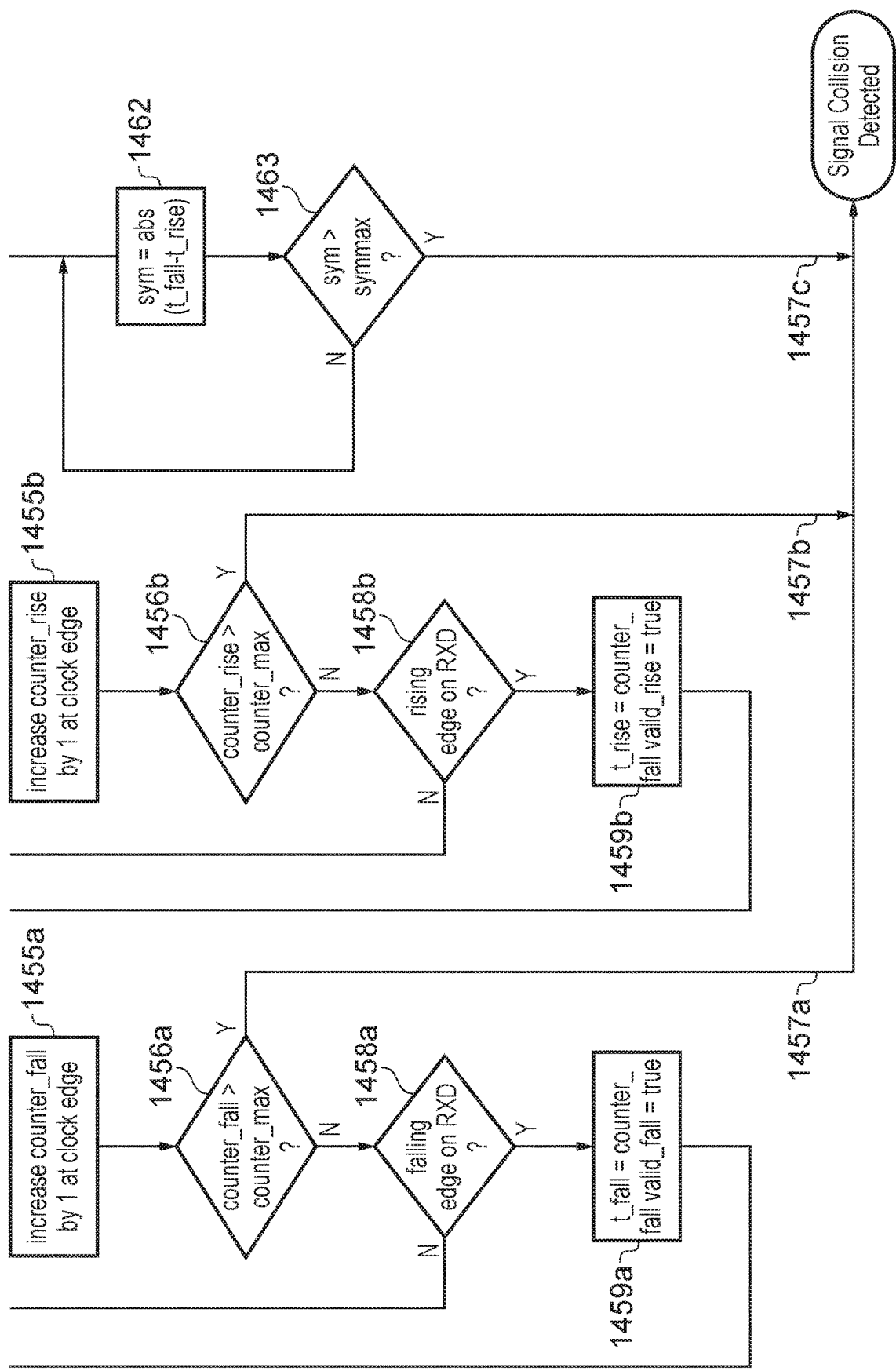

FIG. 14 illustrates an example digital implementation of the disclosure in flow chart 1400, which is represented by three concurrent processes:

1) determining 1400*a* the falling propagation delay from the TXD to the RXD pin;
2) determining 1400*b* the rising propagation delay from the TXD to the RXD pin; and
3) comparing 1400*c* the rising and falling propagation delay from TXD to RXD.

The numbering does not limit the disclosure to any order or succession of the processes. For example, the falling edge may be the first edge and the rising edge may be the second, subsequent edge. According to another example, the rising edge may be the first edge and the falling edge may be the second, subsequent edge.

Processes 1 (1400*a*) and 2 (1400*b*) are similar but differ in detecting a falling or rising edge. After "start" 1451*a,b* the processes first initialize 1452*a,b* a variable (valid_fall and valid_rise) to false which tracks if the propagation delay is measured for the first time. The next step is waiting 1453*a,b* for an edge on a logic level signal on a transmitter input of a CAN transceiver (TXD). When an edge is detected ('y' at steps 1453*,a,b*) the propagation delay variable is reset 1454*a,b* and increased 1455*a,b* with a certain value (in this example with one) at each synchronous clock cycle. If the propagation delay (variable counter_fall or counter rise) is determined to be higher than a predetermined value (variable counter_max) at steps 1456*a,b*, the processese will exit 1457*a,b* into a collision detected. That is, a collision is detected when a timeout has occurred. If instead the propagation delay is lower than the predetermined value, processes 1 and 2 wait for a subsequent corresponding edge 1458*a,b* on a logic level signal on a receiver output of a CAN transceiver (RXD). That is, a falling edge on RXD in process 1 and a rising edge on RXD in process 2. Processes 1 and 2 loop back to steps 1455*a* and 1455*b* respectively if a corresponding edge on RXD is not detected.

After an edge detection 1458*a,b* on the RXD pin the propagation delay is equal to the counter variable (counter_fall or counter rise) and is copied 1459*a,b* into a variable (t fall and t rise) which stores the last measured propagation delay. The variable (valid_fall and valid_rise) to track if the propagation delay is measured for the first time is set 1459*a,b* to true. Processes 1 and 2 then loop to steps 1453*a* and 1453*b* respectively to detect further subsequent edges.

Process 3 (1400*c*) first checks 1460, 1461 if both rising (step 1460) and falling (step 1461) propagation delays are determined (in this example by checking if the variable valid_fall and valid_rise are true—checks that repeat if valid_fall or valid_rise is false) before calculating 1462 the difference between the falling and rising propagation delay (variable sym). Process 3 then determines 1463 if the absolute difference is above a predetermined value (variable symmax) and if this is the case ('y' at step 1463) the process will exit 1457*c* into a collision detected. If the calculated absolute difference is below a predetermined value the process continuous calculates 1462 the difference between the falling and rising propagation delay.

This digital implementation may be implemented, for example, in the transceiver, e.g. CAN XL transceiver 912, or may be implemented, for example, in the controller, e.g. CAN XL controller 910. Upon detection of a collision a switching from "fast" mode to "slow" mode may be initiated. An example use case of the collision detection is switching the transceiver back from "fast" to "slow" mode. The switching is needed on detection of any collision. Slow mode is the desired default, if things go wrong.

In case the controller, e.g. a CAN XL controller, has a dedicated interface to the transceiver, e.g., a CAN XL transceiver, to execute that mode change reliably, there is no issue to do the detection inside the controller—it can switch back the transceiver. If the controller has no guaranteed and reliable access to the transceiver (e.g. because of sharing RXD and TXD pins for that function), there might be the need that the transceiver can detect the collision and switch autonomously back to slow mode. Accordingly, in some examples the CAN unit 902 may be configured to: initialize a respective corresponding delay variable 1455*a,b* to track the measurement of the one or both of the first propagation delay 1145*b* and the second propagation delay 1143*b*; wait for a signal edge 1135*b*, 1137*b* in one or more of the transmitter input signal 1131*b* and the receiver output signal 1133*b*; increment 1455*a,b*, upon detection of the signal edge 1135*b*, 1137*b*, the respective corresponding delay variable by a delay variable value; iterate over the wait and increment configurations until the respective corresponding delay variable exceeds a predetermined value 1156*a,b*; and detect the collision on the CAN bus 904 when the value of the respective corresponding delay variable exceeds the predetermined value.

Figure 15:
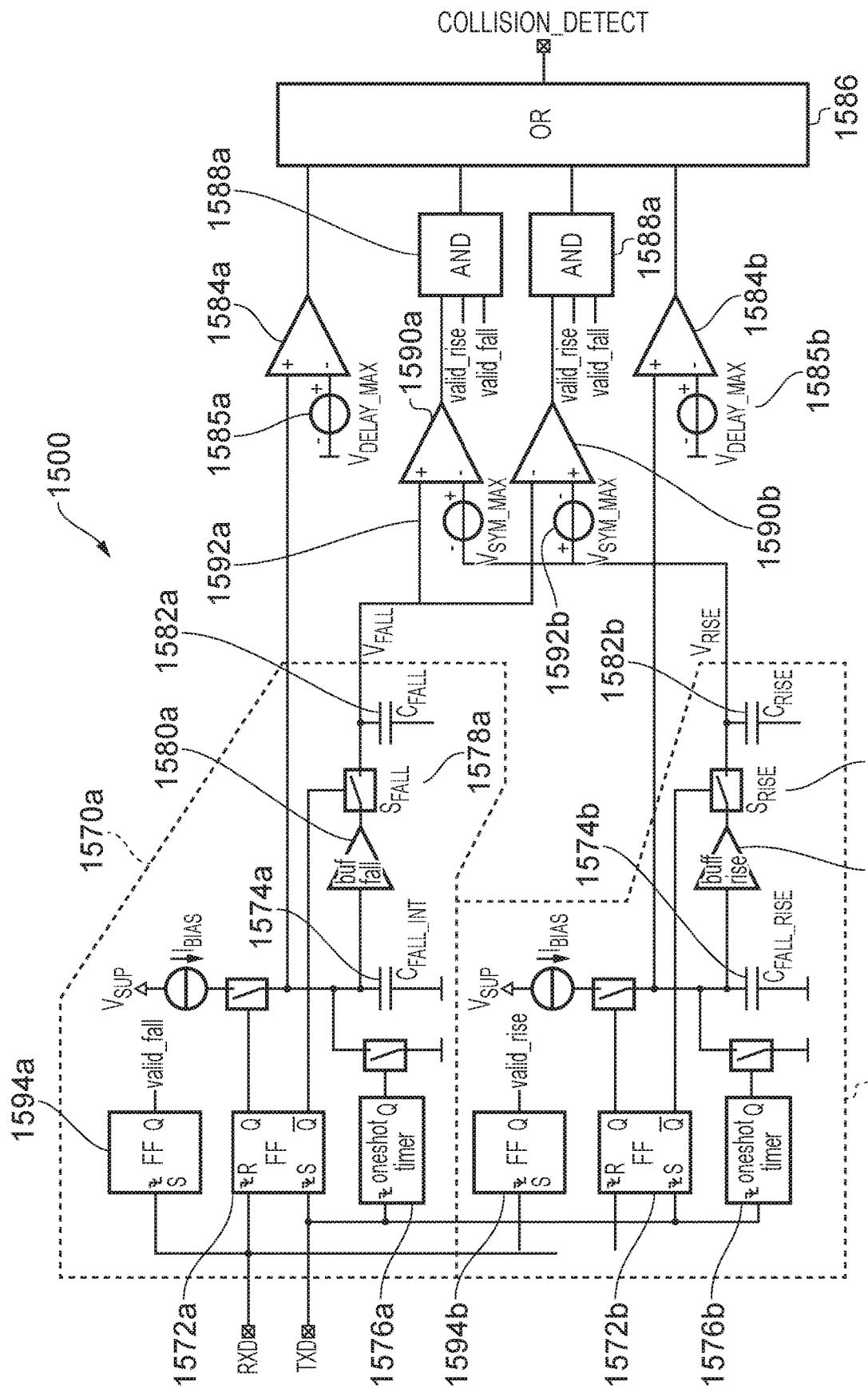
FIG. 15 shows an example analogue implementation of the disclosure.

FIG. 15 illustrates an example analogue implementation 1500. A first branch 1570*a* of the analogue implementation 1500 is for detecting a first type of edge on a logic level signal on a transmitter input (TXD) of a CAN transceiver and a logic level signal on a receiver output (RXD) of the CAN transceiver (e.g., a falling edge). A second branch 1570*b* of the analogue implementation 1500 is for detecting a second type of edge on the logic level signal on the transmitter input (TXD) of the CAN transceiver and the logic level signal on the receiver output (RXD) of the CAN transceiver (e.g., a rising edge).

Each of the first and second branches 1570*a,b* of the analogue implementation 1500 may be configured to detect an edge on the transmitter input (TXD) or receiver output (RXD) pin of a CAN controller or CAN transceiver, time the duration until the detection of a corresponding edge on the corresponding pin, detect the corresponding edge on the corresponding pin and provide, based on the timed duration, a voltage representation of a propagation delay. A collision on a CAN bus may be detected based on the voltage representations of the propagation delays.

In this example, the propagation delay between TXD and RXD is converted into a voltage for the falling and rising edge. At the start of an edge on TXD a flipflop 1572a,b is set and at the same time a tracking capacitor 1574a,b ($C_{FALL\_INT}$ or $C_{RISE\_INT}$) is discharged for a short time (determined by a oneshot timer 1576a,b). A voltage $V_{SUP}$ on the tracking capacitor 1574a,b is increasing due to a constant charging current ($I_{BIAS}$). When the same edge on RXD is detected the flipflop 1572a,b is reset and stops the charging of the capacitor 1574a,b. At the same time a switch ($S_{FALL}$ or $S_{RISE}$) 1578a,b is closed and the voltage on the tracking capacitor is forced via a buffer (buffall and bufrise) 1580a,b onto a storing capacitor ($C_{FALL}$ and $C_{RISE}$) 1582a,b. A buffer voltage $V_{FALL}, V_{RISE}$ across the respective storing capacitors 1582a,b represents the propagation delay between TXD and RXD. This circuitry is present for both the falling and rising edges.

A tracking voltage $V_{SUP}$ on the tracking capacitor 1574a,b is subsequently compared using a comparator 1584a,b to a fixed delay voltage ($V_{DELAY\_MAX}$) 1585a,b that represents a maximum propagation delay time. When the voltage $V_{SUP}$ on the tracking capacitor is higher than the fixed delay voltage ($V_{DELAY\_MAX}$) 1585a,b (such that the comparator 1584a,b outputs a 'high' logic state), a 'COLLISION_DETECT' signal is generated via an OR gate 1586.

A 'COLLISION_DETECT' signal may also be generated based on the rising and falling edge buffer voltage $V_{FALL}$, $V_{RISE}$ over the storing capacitors 1582a,b. In these cases, the falling edge buffer voltage $V_{FALL}$ is first provided to first and second comparators 1590a,b.

The first comparator 1590a is configured to receive the falling edge buffer voltage $V_{FALL}$ at a positive input terminal and a first fixed maximum symmetry voltage 1592a at a negative input terminal. In this example, the first fixed maximum symmetry voltage 1592a is referenced to the rising edge buffer voltage $V_{RISE}$ rather than to ground (compare with the fixed delay voltage $V_{DELAY\_MAX}$ 1585a,b). The first comparator 1590a outputs a 'high' logic state to a first AND gate 1588a when the falling edge buffer voltage $V_{FALL}$ is higher than the first fixed maximum symmetry voltage 1592a. The signal 'COLLISION_DETECT' generated via the OR gate 1586 and the first AND gate 1588 may be valid only after the propagation delay on the falling and rising edge has been measured once (valid_fall and valid_ rise), as detected by a corresponding flipflop 1594a,b triggered on a falling or rising edge on RXD.

The second comparator 1590b is configured to receive the falling edge buffer voltage $V_{FALL}$ at a negative input terminal and a second fixed maximum symmetry voltage 1592b a positive input terminal. As with the first fixed maximum symmetry voltage 1592a, the second fixed maximum symmetry voltage 1592b is referenced to the voltage signal $V_{RISE}$ rather than to ground. The second comparator 1590b outputs a 'high' logic state to a second AND gate 1588b when the second fixed maximum symmetry voltage 1592b is higher than the falling edge voltage $V_{FALL}$. The signal 'COLLISION_DETECT' generated via the OR gate 1586 and the second AND gate 1588 may be valid only after the propagation delays on the falling and rising edges have been measured once (valid_fall and valid_rise), as detected by a corresponding flipflop 1594a,b triggered on a falling or rising edge on RXD.

Accordingly, in some examples a CAN unit 902 of FIG. 9 may be configured to: convert the one or more of the first signal edge propagation delay and the second signal edge propagation delay into respective a first signal edge propagation delay voltage and a second signal edge propagation delay voltage; and detect the collision on the CAN bus when one or more of the first signal edge propagation delay voltage and second signal edge propagation delay voltage exceed respective fixed voltages.

The present disclosure is not limited to the examples. In particular, the order of rising and falling edges occurring on TXD and RXD is not limited to the examples. The first edge may be a rising edge or a falling edge. Consequently, the second, subsequent edge may be a falling edge or a rising edge, respectively.

In some examples of the present disclosure propose differential bus collision detection by measuring the difference in rising and falling propagation delay from transmit data to receive data in case of a symmetrical balance voltage level scheme. In particular, the time delay between TXD and RXD of the same node is detected at subsequent edges (in particular, a first time delay of a first edge between TXD and RXD, and a second time delay of a second, subsequent edge between TXD and RXD), and the detected delays (in particular, the first time delay and the second time delay) are subtracted from each other. If the difference of the detected delays is unequal to 0 then there is a collision. Upon collision detection a switching to "slow" mode may be appropriate.

Although the present examples mainly refer to CAN FD and CAN XL Technology the present disclosure is not limited to those CAN flavors, instead the underlying concept can be transferred to further CAN flavours.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The skilled person will be able to design many alternative embodiments without departing from the scope of the appended claims.

In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A controller area network ("CAN") unit configured to:
   detect a transmit signal edge on a transmit signal for a CAN transceiver;
   detect a corresponding receive signal edge on a receive signal for a CAN controller of the CAN transceiver; and
   detect a CAN bus collision based on a propagation delay between the transmit signal edge and the corresponding receive signal edge;
   wherein the receive signal edge corresponding to the transmit signal edge occurs before the transmit signal edge; and
   wherein the receive signal edge and transmit signal edge are both rising edges.

2. The CAN unit of claim 1, in which the CAN bus collision is detected based on a plurality of propagation delays between respective signal edges on the transmit signal and corresponding signal edges on the receive signal.

3. The CAN unit of claim 1, in which the transmit signal edge is a first transmit signal edge and the corresponding receive signal edge is a first receive signal edge, and the unit is further configured to:
   detect a second transmit signal edge;
   detect a second receive signal edge that corresponds to the second transmit signal edge;
   determine a first propagation delay based on a period between the first transmit signal edge and the first receive signal edge;
   determine a second propagation delay based on a period between the second transmit signal edge and the second receive signal edge;
   detect a CAN bus collision based on a comparison between the first propagation delay and the second propagation delay.

4. The CAN unit of claim 3, in which the first receive signal edge and first transmit signal edge are both falling edges and the second receive signal edge and the second transmit signal edge are both rising edges.

5. The CAN unit of claim 3, in which the CAN bus collision is detected is a difference between the first propagation delay and the second propagation delay is greater than a threshold.

6. The CAN unit of claim 1, in which the receive signal edge corresponding to the transmit signal edge occurs subsequently to the transmit signal edge, and
   in which the receive signal edge and transmit signal edge are both falling edges.

7. The CAN unit of claim 1, in which the CAN bus collision is detected when the propagation delay exceeds a threshold.

8. The CAN unit of claim 1, further configured to detect the CAN bus collision during a fast data phase of CAN operation.

9. The CAN unit of claim 8, further configured to switch to a slow, arbitration mode of operation in response to detecting the CAN bus collision.

10. A method of operating a Controller Area Network ("CAN") transceiver to detect a collision on a CAN bus, the method comprising:
    detecting a transmit signal edge on a transmit signal transmitted by the CAN transceiver;
    detecting a corresponding receive signal edge on a receive signal received by a CAN controller of the CAN transceiver; and
    detecting a collision on the CAN bus based on a propagation delay between the transmit signal edge and the corresponding receive signal edge;
    wherein the receive signal edge corresponding to the transmit signal edge occurs before the transmit signal edge; and
    wherein the receive signal edge and transmit signal edge are both rising edges.

11. A computer program code configured to cause a processor to perform the method of claim 10.

12. A controller area network ("CAN") unit configured to:
    detect a transmit signal edge on a transmit signal for a CAN transceiver;
    detect a corresponding receive signal edge on a receive signal for a CAN controller of the CAN transceiver; and
    detect a CAN bus collision based on a propagation delay between the transmit signal edge and the corresponding receive signal edge when the propagation delay exceeds a time period of at least the range symmetry specification value.

13. The CAN unit of claim 12, further configured to:
    convert the one or more of the first signal edge propagation delay and the second signal edge propagation delay into respective a first signal edge propagation delay voltage and a second signal edge propagation delay voltage; and
    detect the collision on the CAN bus when one or more of the first signal edge propagation delay voltage and second signal edge propagation delay voltage exceed respective fixed voltages.

14. A controller area network, CAN, unit, the unit configured to:
    detect a first transmit signal edge on a transmit signal for a CAN transceiver;
    detect a corresponding first receive signal edge on a receive signal for a CAN controller of the CAN transceiver; and
    detect a CAN bus collision based on a propagation delay between the first transmit signal edge and the corresponding first receive signal edge;
    detect a second transmit signal edge;
    detect a second receive signal edge that corresponds to the second transmit signal edge;
    determine a first propagation delay based on a period between the first transmit signal edge and the first receive signal edge;
    determine a second propagation delay based on a period between the second transmit signal edge and the second receive signal edge;
    detect a CAN bus collision based on a comparison between the first propagation delay and the second propagation delay;
    initialize a respective corresponding delay variable to track the measurement of the one or both of the first propagation delay and the second propagation delay;
    wait for a signal edge in one or more of the transmitter input signal and the receiver output signal;

increment, upon detection of the signal edge, the respective corresponding delay variable by a delay variable value;

iterate over the wait and increment configurations until the respective corresponding delay variable exceeds a predetermined value; and detect the collision on the CAN bus when the value of the respective corresponding delay variable exceeds the predetermined value.

\* \* \* \* \*